(12) United States Patent
Kim et al.

(10) Patent No.: US 10,237,543 B2
(45) Date of Patent: Mar. 19, 2019

(54) DEVICE FOR DISPLAYING MULTI-VIEW 3D IMAGE USING DYNAMIC VIEWING ZONE EXPANSION APPLICABLE TO MULTIPLE OBSERVERS AND METHOD FOR SAME

(75) Inventors: Sung Kyu Kim, Seoul (KR); Ki Hyuk Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 389 days.

(21) Appl. No.: 14/367,467

(22) PCT Filed: Aug. 8, 2012

(86) PCT No.: PCT/KR2012/006273
§ 371 (c)(1),
(2), (4) Date: Jun. 20, 2014

(87) PCT Pub. No.: WO2013/094841
PCT Pub. Date: Jun. 27, 2013

(65) Prior Publication Data
US 2015/0029317 A1    Jan. 29, 2015

(30) Foreign Application Priority Data

Dec. 23, 2011  (KR) .................. 10-2011-0141170
Jul. 3, 2012   (KR) .................. 10-2012-0072384

(51) Int. Cl.
*H04N 13/00* (2018.01)
*H04N 13/368* (2018.01)
(Continued)

(52) U.S. Cl.
CPC ....... *H04N 13/368* (2018.05); *G02B 27/0093* (2013.01); *G02B 27/2214* (2013.01);
(Continued)

(58) Field of Classification Search
CPC ............ G02B 27/2214; G02B 27/0093; H04N 13/0413; H04N 13/0007; H04N 13/0477;
(Continued)

(56) References Cited

U.S. PATENT DOCUMENTS

2007/0188667 A1* 8/2007 Schwerdtner ........ G02B 27/225
349/15
2009/0207237 A1  8/2009 Leveco et al.
(Continued)

FOREIGN PATENT DOCUMENTS

CN       1894976 A    1/2007
CN     101546043 A    9/2009
(Continued)

OTHER PUBLICATIONS

European Search Reported dated Jul. 27, 2015.
(Continued)

*Primary Examiner* — Dave Czekaj
*Assistant Examiner* — Berteau Joisil
(74) *Attorney, Agent, or Firm* — Harness, Dickey & Pierce, P.L.C.

(57) ABSTRACT

The present invention relates to a device for displaying a multi-view 3D image by using viewing zone expansion that is applicable to multiple observers, and to a method for same, comprising: an image display panel for displaying a 3D image; a control portion for controlling an image view of each 3D pixel line; and a system for tracking the position of the pupils of both eyes of the observer, wherein each of the 3D pixel lines provide at a multi-view of at least four views, and the control portion selects first and second views that are close to the center of each of the pupils of both eyes of the observer for each viewing zone of the view formed by each of the 3D pixel lines and provides one image view from both eyes of the observer to the first view, by using three
(Continued)

dimensional coordinates of the position of the pupils of both eyes of the observer that are determined by the system for tracking the position of the pupils of both eyes of the observer.

19 Claims, 22 Drawing Sheets

(51) Int. Cl.
    *H04N 13/305*     (2018.01)
    *H04N 13/31*     (2018.01)
    *H04N 13/383*     (2018.01)
    *G02B 27/22*     (2018.01)
    *G02B 27/00*     (2006.01)
    *H04N 13/376*     (2018.01)
    *H04N 13/315*     (2018.01)
    *H04N 13/106*     (2018.01)
(52) U.S. Cl.
    CPC ......... *H04N 13/106* (2018.05); *H04N 13/305* (2018.05); *H04N 13/31* (2018.05); *H04N 13/315* (2018.05); *H04N 13/376* (2018.05); *H04N 13/383* (2018.05)
(58) Field of Classification Search
    CPC ........... H04N 13/0404; H04N 13/0409; H04N 13/001; H04N 13/0101; H04N 13/0018
    See application file for complete search history.

(56) References Cited

U.S. PATENT DOCUMENTS

| | | | | |
|---|---|---|---|---|
| 2010/0157026 | A1* | 6/2010 | Reichelt | G02B 26/005 348/51 |
| 2010/0259604 | A1* | 10/2010 | Surman | G02B 27/225 348/54 |
| 2011/0285700 | A1* | 11/2011 | Kim | G02B 27/0093 345/419 |

FOREIGN PATENT DOCUMENTS

| | | |
|---|---|---|
| CN | 101931823 A | 12/2010 |
| CN | 102176755 A | 9/2011 |
| EP | 0836332 A2 | 4/1998 |
| JP | 08-110495 A | 4/1996 |
| KR | 20100085753 A | 7/2010 |
| WO | 2008/132724 A1 | 11/2008 |

OTHER PUBLICATIONS

Chinese Office Action dated Nov. 3, 2015 for corresponding CN Application No. 201280070504.X.
International Search Report dated Dec. 21, 2012; PCT/KR2012/006273.

\* cited by examiner

HORIZONTAL POSITION

HORIZONTAL POSITION

HORIZONTAL POSITION

DEVICE FOR DISPLAYING MULTI-VIEW 3D IMAGE USING DYNAMIC VIEWING ZONE EXPANSION APPLICABLE TO MULTIPLE OBSERVERS AND METHOD FOR SAME

TECHNICAL FIELD

The present invention relates to a field of three-dimensional (3D) displays, and more particularly, to a device and method for displaying a multi-view 3D image that may increase brightness uniformity of viewing zones, reduce crosstalk, dynamically optimize all the viewing zones even when a viewer moves in a three dimensional space by adjusting a size of each viewing zone, and also apply to multiple viewers.

BACKGROUND ART

Autostereoscopic 3D image display devices are classified into a type using an optical plate, such as a lenticular lens or parallax barrier, and a type using a line light source array for forming a viewing zone. The 3D image display devices using the parallax barrier, the lenticular lens, and the line light source array for forming the viewing zone have a crosstalk phenomenon in which a distribution of light and an image of an adjacent viewpoint are partially overlapped with each other according to movement of eyes even in the same viewing zone. Accordingly, it is difficult to implement a natural 3D image when a viewer moves, thereby causing viewer inconvenience.

FIG. 1 shows a brightness distribution of viewing zones for viewpoints according to horizontal position movement of the conventional autostereoscopic 3D image display device using the parallax barrier at an optimal viewing distance. In FIG. 1, on the assumption that a distance between viewpoints is the same as a distance between a viewer's pupils (about 65 mm), when the viewer at the optimal viewing distance is positioned in front of the 3D image display device, the left eye of the viewer is positioned at a center of a first viewing zone (position A), and the right eye of the viewer is positioned at a center of a second viewing zone (position C), an image in the corresponding viewing zone of each viewpoint becomes dark rapidly as both of the viewer's eyes deviate from the position A and the position C, thereby degrading image quality. Further, a portion of an image disposed in the first viewing zone and a portion of an image disposed in a third viewing zone are simultaneously viewed by the left eye of the viewer even when the left eye is positioned at the center of the second viewing zone, and a portion of a left eye image disposed in the second viewing zone and a portion of an image disposed in a fourth viewing zone are simultaneously viewed by the right eye of the viewer even when the right eye is positioned at the center of the third viewing zone. Accordingly, a certain amount of crosstalk occurs even at the optimal position, and the amount thereof increases when the viewer leaves the optimal position. In particular, when the left eye of the viewer is positioned at a middle position (position B) between the first viewing zone and the second viewing zone, and the right eye of the viewer is positioned at a middle position between the second viewing zone and the third viewing zone, the maximum crosstalk occurs. Further, since the distance between viewpoints is designed to be appropriate for a distance between an average viewer's pupils even when the viewer stops, left and right optimal bright images cannot be viewed in the brightness distribution of the viewing zone of FIG. 1 when a distance between the pupils of a viewer who views a 3D image deviates from the average.

The above problems occur in the conventional autostereoscopic 3D image display device when the viewer views the 3D image at a position near the optimal viewing distance while stopping or moving. In addition, basically, when moving in a depth direction, the viewer cannot view the 3D image well. This will be described with reference to FIGS. 2 to 5.

FIGS. 2 to 5 are diagrams for describing an example of a conventional autostereoscopic 3D image display device using a four-viewpoint parallax barrier. The viewing zones are separated well at the optimal viewing distance as shown in FIG. 1. However, for example, if a viewer leaves an optimal viewing distance (OVD) position in a depth direction and moves toward a position P1 (position at a distance of 0.5 times the OVD), unlike the OVD, a viewing zone for a left eye viewing point and a viewing zone for a right eye viewing point are not separated well and each of the viewing zones overlaps its adjacent viewing zone, and thus the viewer cannot view a 3D image well (see FIG. 4 for the distribution of viewing zones at the position P1). Here, since the viewing zones for respective apertures do not accurately match with each other, adjacent viewing zones are represented as overlapping. FIG. 4 shows a result of simulating all images for the same viewpoint together. A viewing zone for an individual aperture does not expand individually. This phenomenon takes place since position which viewing zone is formed by each aperture varies according to each aperture of 3D display. This result may be seen in FIGS. 7 and 8, which show viewing zone distribution charts for an individual aperture. The individual aperture of the parallax barrier and pixels which view point images are provided defining the viewing zone distribution charts is defined as a 3D pixel line. Alternatively, the 3D pixel line as a unit configuration of 3D viewing zone may be defined by a lenticular lens of one period as parallax separating means and pixels which view point images are provided, or a line source and pixels which view point images are provided in 3D image display. Also, although not shown in FIG. 2, even when the viewer moves to a position at a distance 1.5 times the OVD, as shown in FIG. 5, a viewing zone shape varies for a similar reason to that of FIG. 4 and crosstalk increases. To describe this in more detail with reference to FIG. 4, considering the intersection of boundaries between viewing zones within a dotted line of a position P1 of FIG. 2, when a pupil is positioned at a depth position of the position P1, for example, a position e1, a 3D image may be viewed near the center of the third viewing zone through a central aperture, but a 3D image from a left side aperture is positioned on a boundary between the first viewing zone and the second viewing zone such that the 3D image causes the viewer to experience maximum crosstalk. Also, although a 3D image from a right side aperture is not exactly shown in the drawings, since the 3D image is positioned at a boundary between the fourth viewing zone and a first viewing zone in a sub viewing zone, the 3D image allows a viewer to experience maximum crosstalk and an inverse viewing zone. Accordingly, even when there is one pupil at a center of a viewing zone of any one pixel in consideration of all apertures, there are multiple cases in which one pupil is on a boundary between viewing zones even when the viewing zone closest to the center of the pupil is selected among viewing zones of other apertures, depending on the case. In this case, as described above, the crosstalk is completely or approximately maximized for each aperture. Accordingly, the crosstalk increases on average. This situation occurs even when the distance is far from the OVD. Accordingly, if the viewer is sufficiently far from the OVD, a large amount of crosstalk inevitably occurs at all positions.

Lastly, the conventional autostereoscopic 3D image display device is generally designed such that one viewer may view a 3D image. For a plurality of viewers, the autostereoscopic 3D image display device may allow only viewers positioned at restricted positions, that is, specific positions within the optimal viewing distance, to view a 3D image at their positions.

Accordingly, there is a demand for a autostereoscopic image display device for viewing a natural 3D image even when a plurality of viewers move freely as a solution for the above-described four problems.

DISCLOSURE

Technical Problem

An object of the present invention is to solve the above-described problems by providing a autostereoscopic multi-view 3D image display device and method using pupil tracking that may increase brightness uniformity of viewing zones corresponding to positions of binocular pupils when the pupils are tracked in real time, minimize crosstalk, and dynamically optimize all the viewing zones even when a viewer moves in a three dimensional space.

Furthermore, another object of the present invention is to implement the multi-view 3D image display device and method for one person or multiple persons.

Technical Solution

One aspect of the present invention provides a multi-view 3D image display device including: an image display panel configured to display a 3D image; a control portion configured to control a viewpoint image of each of 3D pixel lines; and a viewer eye pupil position tracking system, in which the 3D pixel line provides multiple, at least four, viewpoints, and the control portion selects a first viewpoint and a second viewpoint that are close to viewer's eye pupils for a viewing zone of a viewpoint for each 3D pixel line by using three dimensional coordinate values of positions of the viewer's eye pupils determined by the viewer eye pupil position tracking system, provides a viewpoint image of one of the viewer's eyes to the first viewpoint, and provides a viewpoint image of another of the viewer's eyes to the second viewpoint.

The image display panel may display a 3D image by using a parallax barrier or lenticular lens which is a parallax separation means, or a line light source, and the 3D pixel line may include an aperture of the parallax barrier, the lenticular lens, or the line light source, and pixels on the image display panel for providing viewpoint images.

The control portion may provide a viewpoint image of the first viewpoint to one or more viewpoints adjacent to the first viewpoint to form a first integrated viewpoint and provide a viewpoint image of the second viewpoint to one or more viewpoints adjacent to the second viewpoint to form a second integrated viewpoint.

The control portion may adjust brightness of each of viewpoints constituting the first or second integrated viewpoint to flatten brightness of a central portion of each of integrated viewing zones formed by the first integrated viewpoint and the second integrated viewpoint.

The control portion may adjust an aperture width of a parallax barrier, a focal distance of a lenticular lens, or a line width of a line light source to flatten a central portion of each of integrated viewing zones when shapes of viewpoint viewing zones formed from the 3D pixel line are integrated.

The control portion may flatten a central portion of an integrated viewpoint viewing zone by reducing viewing zone brightness of an even numbered viewpoint from a starting viewpoint among viewpoints constituting an integrated viewpoint when the number of viewpoints constituting the first or second integrated viewpoint is an odd number of three or more.

When there is at least one intermediate viewpoint between the first integrated viewpoint and the second integrated viewpoint, the control portion may remove image data of the at least one intermediate viewpoint to minimize crosstalk.

The control portion may define a limit in an amount of movement in a depth direction in consideration of a degree in which a width of a viewing zone corresponding to each viewpoint is reduced when a viewer moves in the depth direction, and provide an additional viewpoint corresponding to a width of a total viewing zone that is reduced when changing to the depth direction, thus controlling the number of viewpoints for the integrated viewpoint and minimizing crosstalk even when moving in the depth direction.

The first integrated viewpoint and the second integrated viewpoint may be formed after the pixels constituting the 3D pixel line are set by using viewer eye position information determined by the viewer eye pupil position tracking system, such that eyes of the viewer are included in a main viewing zone.

Each of the first integrated viewpoint and the second integrated viewpoint may include viewpoints of a main viewing zone and viewpoints of a sub viewing zone that does not overlap with the main viewing zone.

When the viewer moves in the depth direction, the control portion may change the number of viewpoints constituting each of the first integrated viewpoint and the second integrated viewpoint such that a width of an integrated viewing zone of each of the first integrated viewpoint and the second integrated viewpoint is kept constant, in consideration of a rate of decreasing a width of a unit viewing zone that is formed by one viewpoint at a closest distance from the 3D image display device or a rate of increasing a width of a unit viewing zone that is formed by one viewpoint at a farthest distance from the 3D image display device.

The viewer eye pupil position tracking system may track positions of a plurality of viewers and track positions of the each viewers' eye pupils to deliver information about the number of viewers and the positions of the plurality of viewers' eye pupils to the control portion.

The control portion may select viewpoints closest to the centers of the plurality of viewers' eye pupils for each viewing zone of the viewpoint that is formed for each 3D pixel line by using 3D information about the positions of viewers' eye pupils that are tracked in real time by the viewer eye pupil position tracking system, integrate one or more adjacent viewpoints for each of the selected viewpoints, and provide a viewing zone formed by the integrated viewpoint to each of the plurality of viewers' eyes.

When there is at least one intermediate viewpoint between the integrated viewpoints provided to the plurality of viewers' eyes, the control portion may remove image data of the at least one intermediate viewpoint to minimize crosstalk.

The 3D pixel line may have a length equal to or greater than a size of one pixel unit and equal to or less than a sum of sizes of pixels for displaying a viewpoint image, thus giving an effect of a 3D pixel point.

Another aspect of the present invention provides a method of displaying a multi-view 3D image using a multi-view 3D image display device including an image display panel configured to display a 3D image, a control portion configured to control a viewpoint image of each of 3D pixel lines that provide multiple, at least four, viewpoints, and a viewer eye pupil position tracking system, the method including: acquiring three dimensional coordinate values of positions of a viewer's eye pupils through the viewer eye pupil position tracking system; selecting a first viewpoint and a second viewpoint that are close to centers of the viewer's eye pupils for a viewing zone of a viewpoint for each 3D pixel line by using the three dimensional coordinate values of positions of the viewer's eye pupils acquired from the viewer eye pupil position tracking system through the control portion; and providing a viewpoint image of one of the viewer's eyes to the first viewpoint and a viewpoint image of another of the viewer's eyes to the second viewpoint through the control portion.

The image display panel may display a 3D image by using a parallax barrier or lenticular lens which is a parallax separation means, or a line light source, and the 3D pixel line may include an aperture of the parallax barrier, the lenticular lens, or the line light source, and pixels on the image display panel for providing viewpoint images.

The method may further include providing a viewpoint image of the first viewpoint to one or more viewpoints adjacent to the first viewpoint to form a first integrated viewpoint through the control portion and providing a viewpoint image of the second viewpoint to one or more viewpoints adjacent to the second viewpoint to form a second integrated viewpoint through the control portion.

The brightness of each of the viewpoints constituting the first or second integrated viewpoint may be adjusted through the control portion to flatten brightness of a central portion of each of integrated viewing zones formed by the first integrated viewpoint and the second integrated viewpoint.

Advantageous Effects

According to the autostereoscopic multi-view 3D image display device and method according to an embodiment of the present invention, it is possible to implement a 3D display device that may solve a conventional technical problem and allow a viewer to comfortably view a 3D image with no fatigue while moving freely by minimizing crosstalk between binocular viewpoints and viewing a clear 3D image even in a depth direction.

To provide a more detailed description, first, viewing zones of binocular viewpoints of a viewer is partially overlapped with each other and thus crosstalk occurs in related art even when a viewer views a 3D image at an optimal viewing distance. However, the 3D display device according an embodiment of the present invention may allow the viewer to view a clear 3D image with minimal crosstalk or brightness change in image even when an eye of the viewer is not positioned at a center of a viewing zone of the corresponding viewpoint or is moved in a three dimensional space, by providing the same image to binocular viewpoints corresponding to binocular pupils of the viewer and one or more adjacent viewpoints, changing image brightness of a needed viewpoint or viewpoints among integrated binocular viewpoints, expanding a viewing zone with no crosstalk, and minimizing the change in brightness within the integrated viewing zone.

Second, an optimal 3D image cannot be viewed, irrespectively of adjustment, in viewing a 3D image in related art when a distance between a viewer's eyes is greater or less than an average distance (e.g., approximate 65 mm). However, the 3D display device according to an embodiment of the present invention may have a sufficiently wide optimal viewing zone with no crosstalk, thus allowing even a viewer having a distance between the viewer's eyes that is different from the average distance to view a clear 3D image.

Third, a clear 3D image cannot be viewed when a viewer moves in a depth direction from an optimal viewing distance in related art. However, the 3D display device according to an embodiment of the present invention may allow a viewer to view a clear 3D image even when the viewer moves in the depth direction, by controlling an integrated viewpoint for each 3D pixel line.

Fourth, the autostereoscopic multi-view 3D image display device and method may be applied for multiple viewers as well as only one viewer.

MODES OF THE INVENTION

Hereinafter, preferred embodiments of the present invention will be described in detail with reference to the accompanying drawings. However, the following embodiments are provided for those skilled in the art to fully understand the present invention and thus may be embodied in different forms. Accordingly, the present invention should not be construed as limited to the embodiments set forth herein.

A autostereoscopic 3D image display device according to a preferred embodiment of the present invention is described with reference to FIG. 9.

Figure 9:
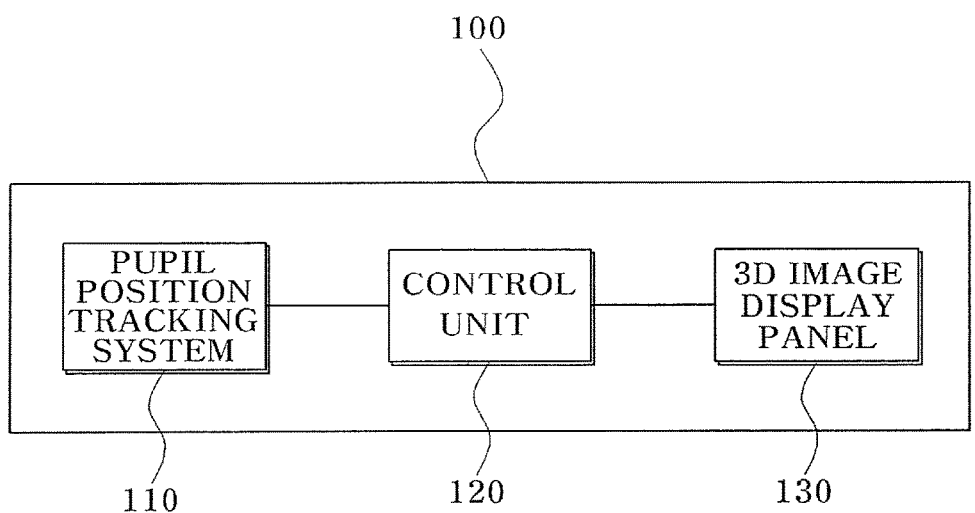
FIG. 9 is a block diagram illustrating a multi-view 3D image display device according to a preferred embodiment of the present invention.

FIG. 9 is a block diagram illustrating a 3D image display device according to a preferred embodiment of the present invention. The 3D image display device 100 according to a preferred embodiment of the present invention includes a 3D image display panel 130 and a control portion 120 configured to control a viewpoint image of each 3D pixel line. It is preferable that each 3D pixel line provide multiple viewpoints, for example, four viewpoints or more.

The 3D image display device 100 according to a preferred embodiment of the present invention further includes a pupil position tracking system 110 configured to determine a position of a viewer's pupil and deliver positional information to the control portion 120. The control portion 120 rearranges a left eye viewing zone and a right eye viewing zone for each 3D pixel line according to the position of the viewer's eyes using the positional information delivered from the pupil position tracking system 110 and controls the image display panel 130 to provide specific image information to respective viewing zones. The control portion 120 controls an overall operation of the pupil position tracking system 110 and the image display panel 130. For example, the control portion 120 selects a viewpoint close to a center of each of the viewer's eye pupils with respect to a viewing zone of a viewpoint formed for each 3D pixel line by using a three dimensional coordinate value of a position of the viewer's eye pupil, which is determined by the pupil position tracking system 110, and provides a corresponding viewpoint image to each viewpoint.

The image display panel 130 may use a parallax barrier or a lenticular lens for parallax separation, or a line light source to display a 3D image. The parallax barrier or lenticular lens is a parallax separation means, which is an optical plate in which a left eye image and a right eye image are separated from each other and alternately formed such that the viewer may view a 3D image at a certain viewing distance. The parallax barrier may have a barrier and an aperture alternatively formed therein, and the lenticular lens may have, for example, cylindrical lenses periodically formed therein. However, the parallax barrier separation means is not limited thereto. Of course, various means, such as an optical plate in which micro prisms are periodically disposed, may be used to achieve this object of the present invention. The line light source may include several types such as a line light source including point light sources for displaying a 3D image.

Figure 10:
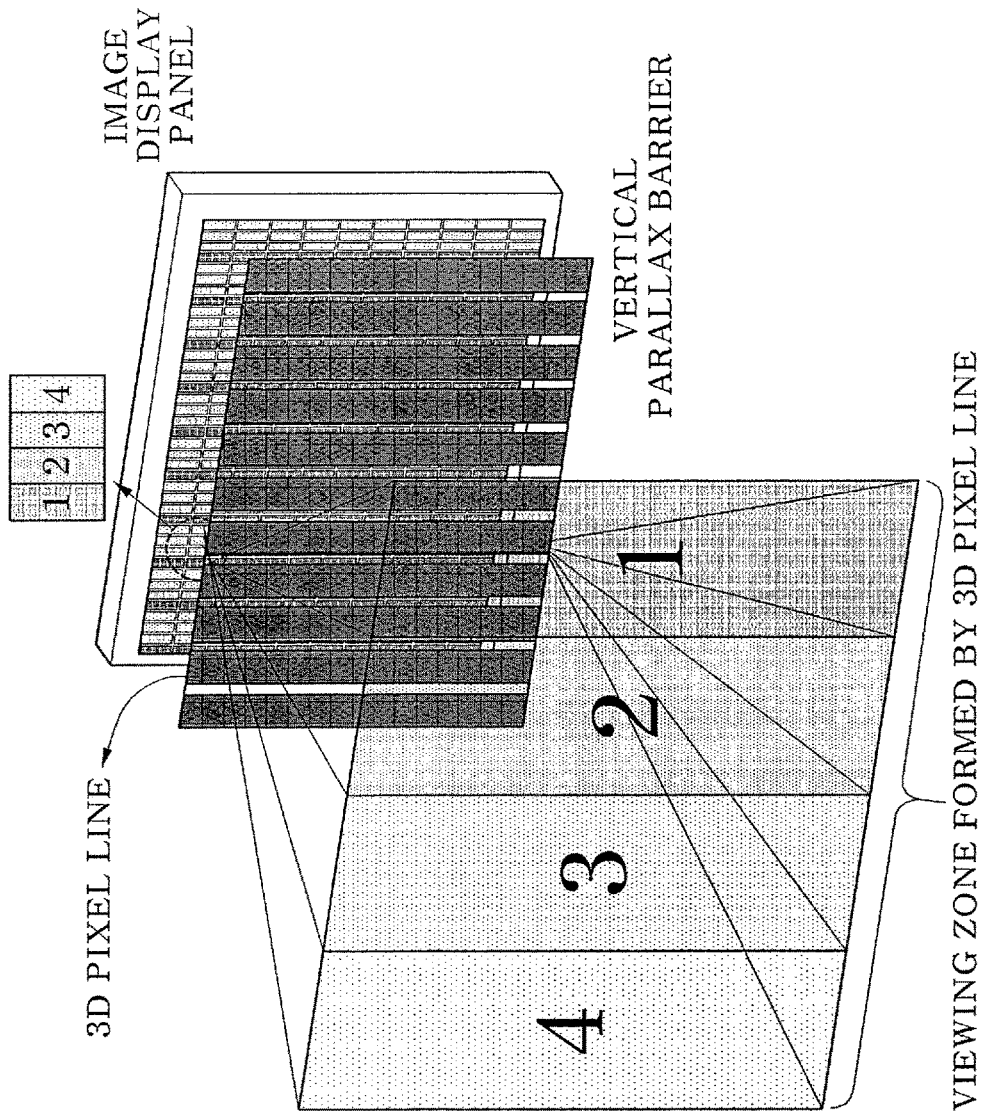
FIGS. 10 and 11 are conceptual views illustrating a 3D pixel line when a parallax barrier is used.

In order to dynamically reconfigure a viewing zone according to an embodiment of the present invention, the concept of the 3D pixel line may be applied to a case of using a parallax barrier or a lenticular lens optical plate and a case of using a line optical source array as a light source for forming a viewing zone. The 3D pixel line includes an aperture of a parallax barrier, a lenticular lens, or a line light source, and pixels on an image display panel that provides respective viewpoint images. FIG. 10 is a conceptual view illustrating the concept of the 3D pixel line when the parallax barrier is used. FIG. 10 shows a case in which a vertical 3D pixel line is used, and FIG. 11 shows a case in which an inclined 3D pixel line is used.

Figure 11:
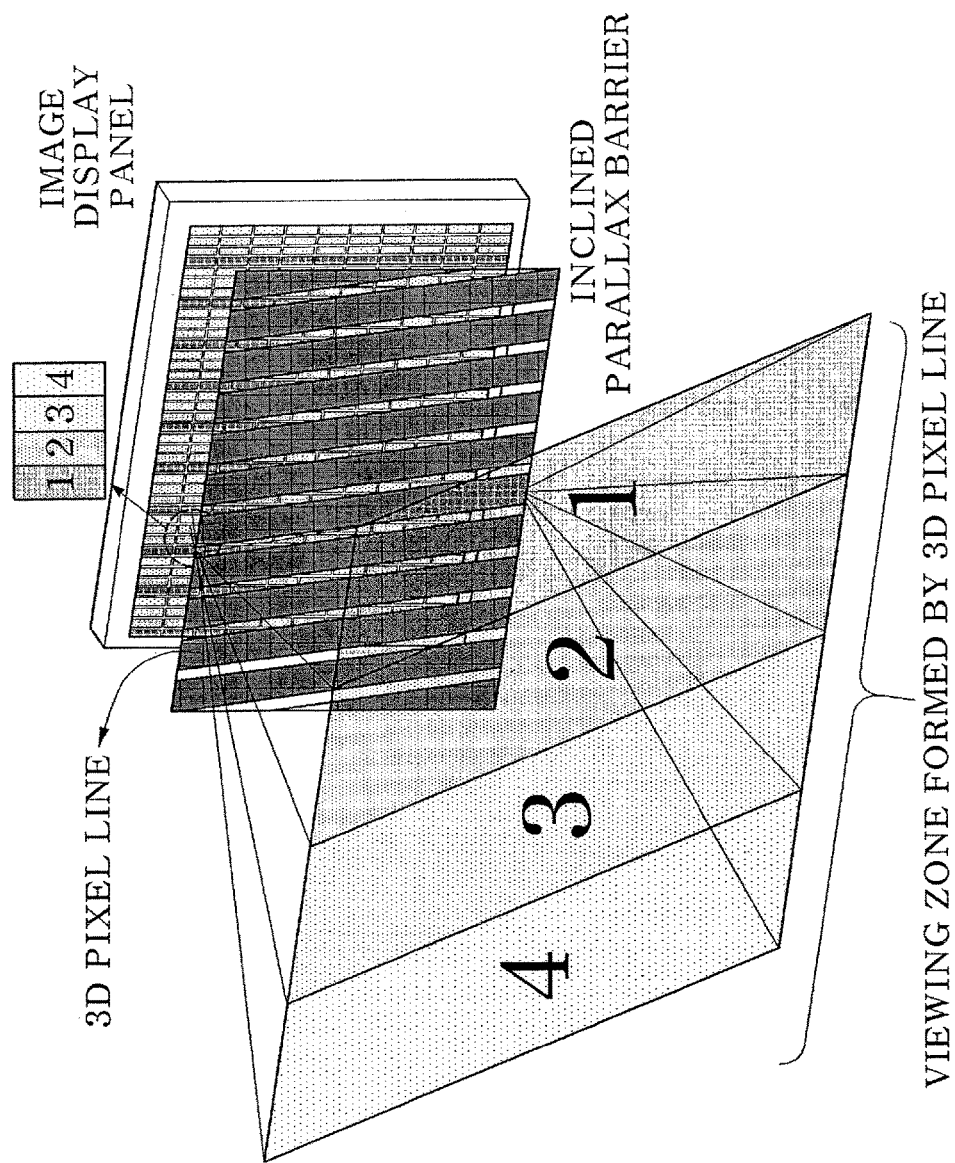

Referring to FIGS. 10 and 11, if the parallax barrier is used in the autostereoscopic 3D image display device that provides multiple viewpoints, viewing zones corresponding to the number of viewpoints needed for each pixel line are generated. For example, four unit viewing zones are generated because there are four viewpoints as shown in FIGS. 10 and 11.

Figure 3:
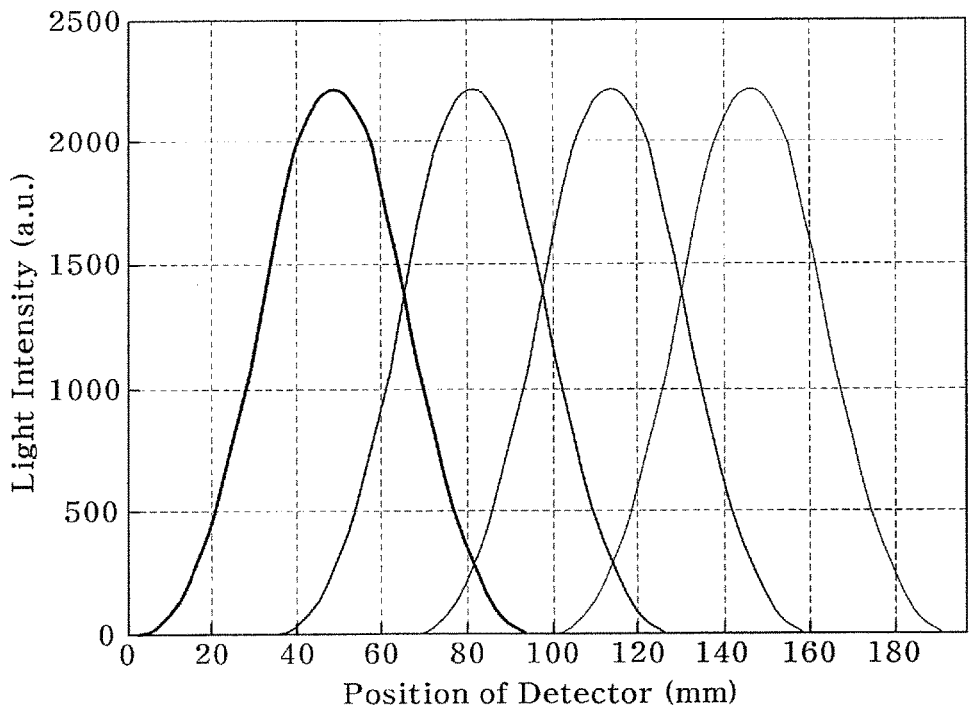
FIG. 3 is a view illustrating a viewing zone distribution at an optimal viewing distance in the 3D image display device using a parallax barrier according to the related art.
Figure 4:
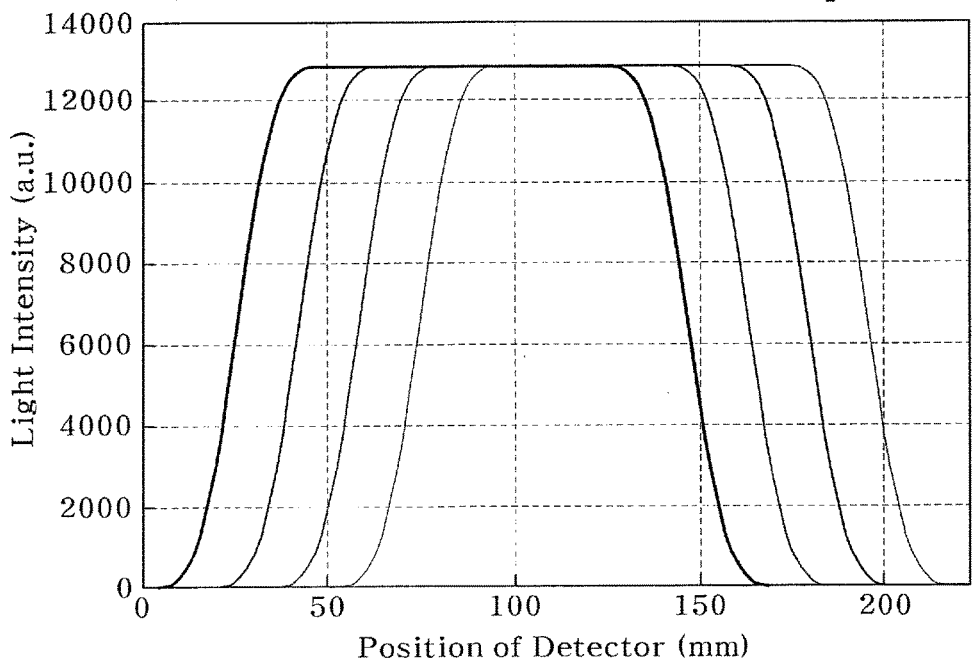
FIG. 4 is a view illustrating increase in crosstalk due to inconsistency in position of same viewing zones generated at different position of the 3D image display device when a viewer moves toward a position P1 (a distance which is ½ of an OVD depth) in a depth direction.
Figure 5:
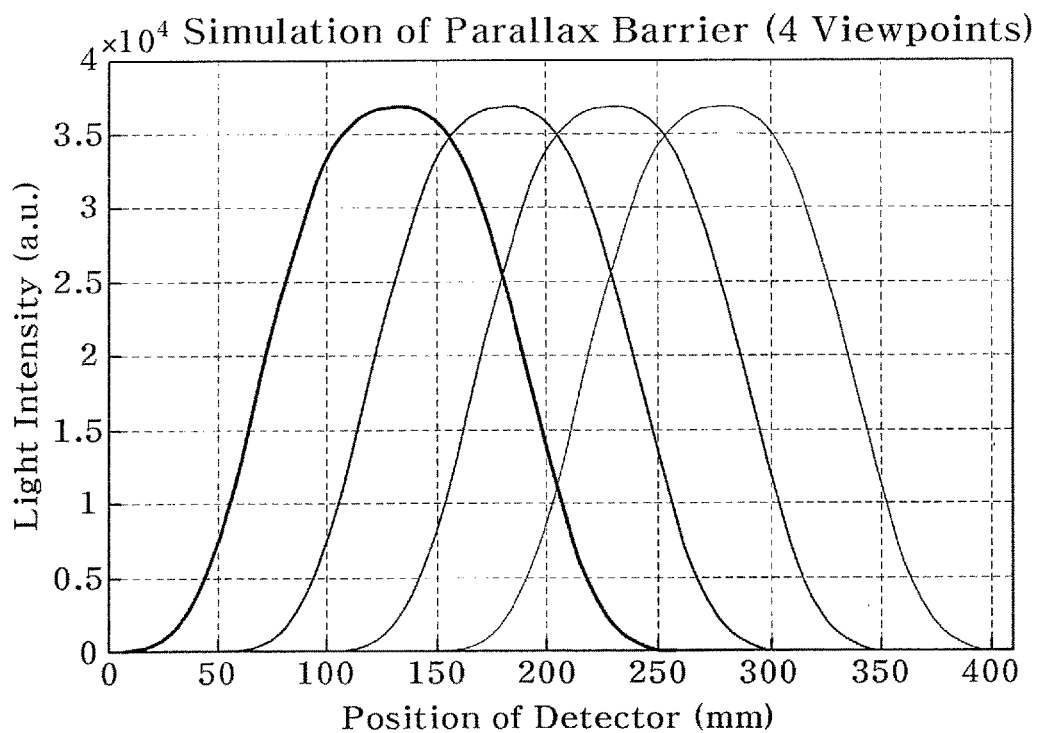
FIG. 5 is a view illustrating increase in crosstalk generated at a distance of 1.5 times the OVD.
Figure 6:
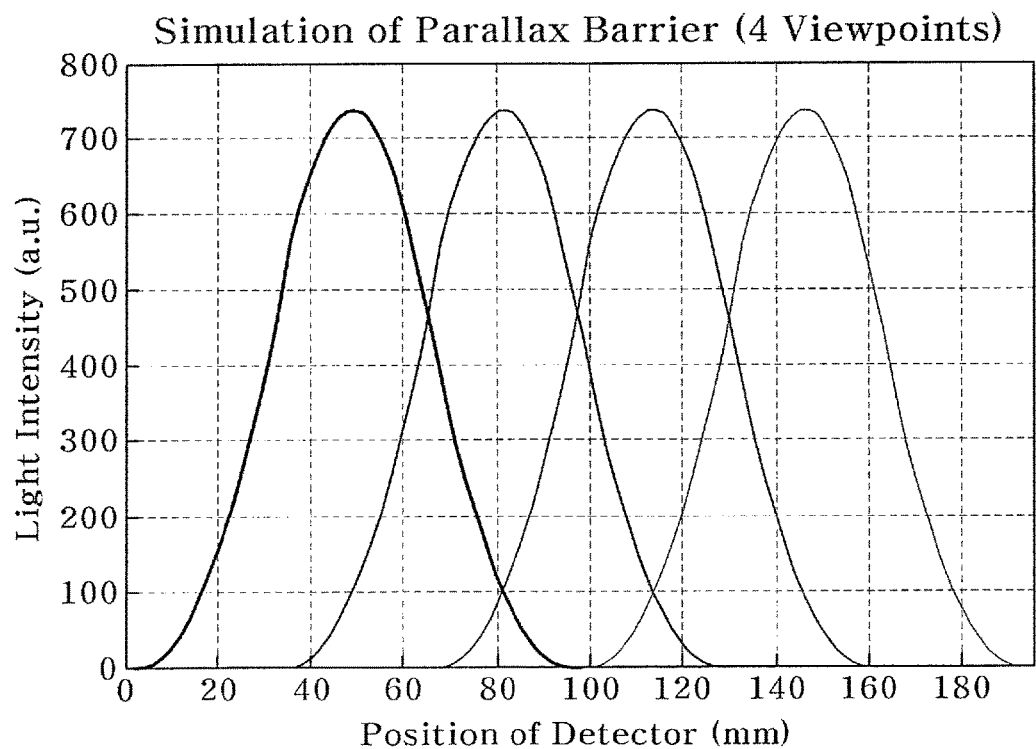
FIG. 6 is a view illustrating a viewing zone distribution at the OVD for each 3D pixel line when the viewing zone is considered for each 3D pixel line.
Figure 7:
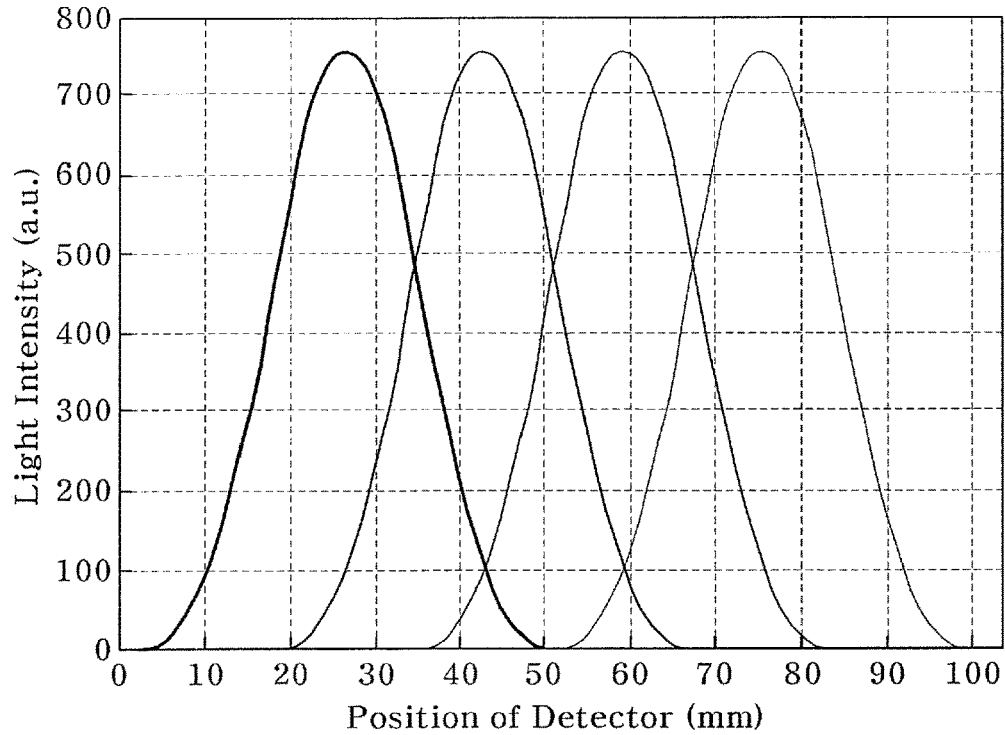
FIG. 7 is a view illustrating a viewing zone distribution for each 3D pixel line when a viewer moves to P1 (½ of the OVD) in a depth direction.
Figure 8:
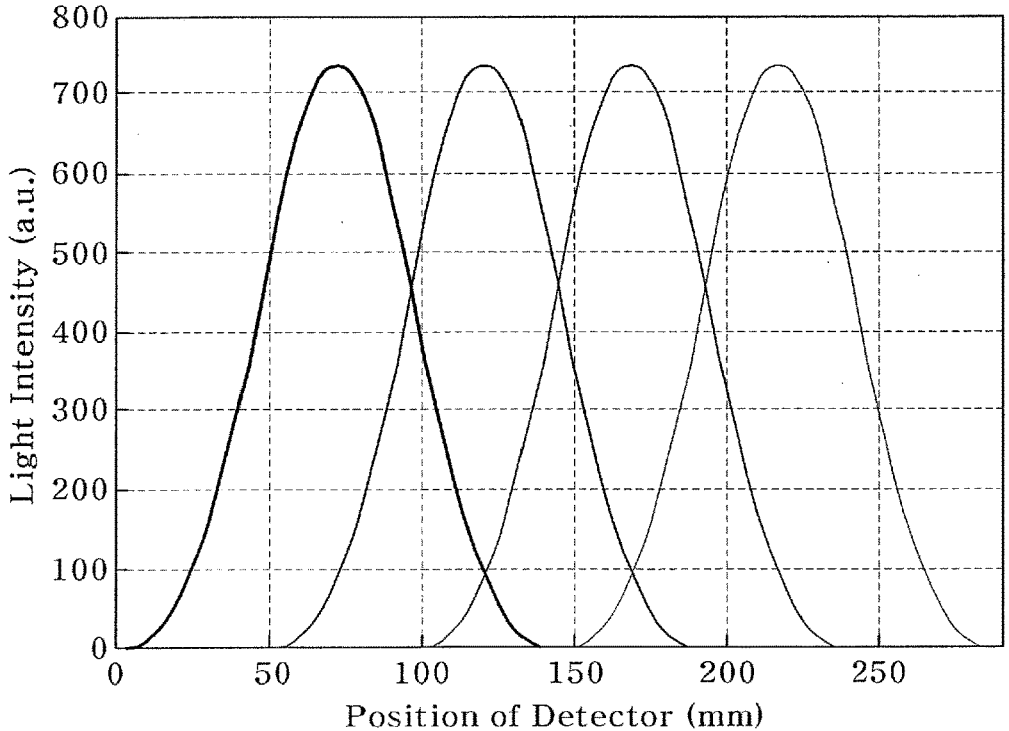
FIG. 8 is a view illustrating a simulation result of a viewing zone distribution for each 3D pixel line when a viewer moves at a distance of 1.5 times the OVD in a direction away from the OVD.

The reason why using the concept of the 3D pixel line is that a viewing position in a depth direction is limited because the viewpoint image is properly separated only at a position (optimal position) of a specific viewer in a typical 3D image display device. A viewing zone similar to that in an OVD position of FIG. 3 may be formed even when a viewer moves in a depth direction, by changing pixels that is used along with an aperture of the same parallax barrier as one pair to form the 3D pixel line as a position of the viewer changes in a depth direction and performing control for each 3D pixel line according to a position of the viewer's eye, using the above-described concept of the 3D pixel line. One 3D pixel line is the smallest unit that provides a viewpoint image to a viewer. A plurality of 3D pixel lines may allow a 3D image of an entire screen to be viewed. Accordingly, a problem in which a 3D image cannot be viewed well because the viewing zone is not properly separated as shown in FIG. 4 may be solved by considering a viewing zone for each 3D pixel line. Although the viewing zone is formed for each 3D pixel line, crosstalk between binocular viewpoints may occur or brightness uniformity of a 3D image may decrease when the viewing zone has the same shape as that at the OVD position of FIG. 3. In this case, advantages, for example, minimal crosstalk and uniform brightness distribution in the viewing zone, may be obtained by selecting a viewpoint for each 3D pixel line which is forming a viewing zone closest to a center of a position of a pupil using position information on a viewer's binocular pupils and integrating the selected viewpoint and an adjacent unit viewpoint. In addition, a method of performing control according to a 3D pixel line and integrating viewpoints may be applied to a general viewing zone design and integral photography (IP). This will be described below with reference to FIG. 14.

In addition, although FIGS. 10 and 11 show only a main viewing zone including four viewing zones that are formed for each 3D pixel line, there is a sub viewing zone including four viewing zones, which is adjacent to the main viewing zone. The sub viewing zone is formed by the 3D pixel line including pixels constituting the main viewing zone and adjacent apertures.

If the viewer's eyes are positioned in the main viewing zone and then moved to the sub viewing zone (not shown) or between the main viewing zone and the sub viewing zone, the viewer's both eyes may be allowed to be included in the main viewing zone by checking positions of the viewer's eyes in real time and selecting a pair of an aperture and pixels, which constitute an appropriate 3D pixel line. As a result, unlike the conventional autostereoscopic 3D image display device, the viewer may be adjusted to be always in the main viewing zone by providing a viewpoint image using a method of tracking a position of the viewer and reconfiguring pixels in an image display panel assigned to an appropriate 3D pixel line.

Figure 12:
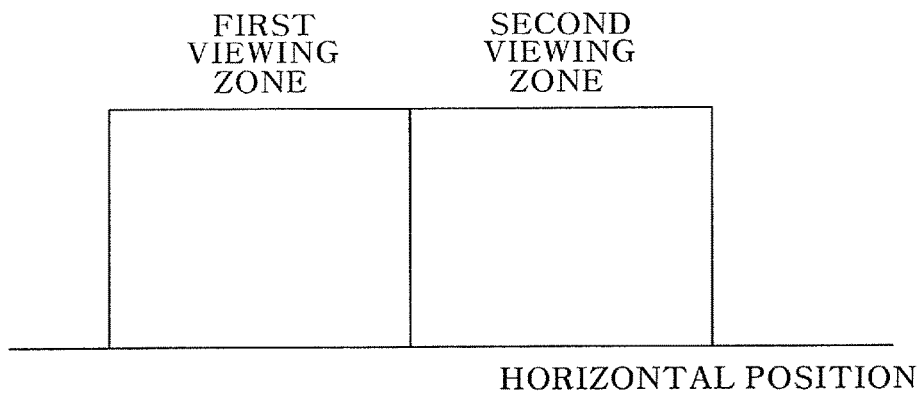
FIGS. 12 and 13 are conceptual views illustrating a brightness distribution and a disposition of viewing zones according to a preferred embodiment of the present invention.

FIG. 12 is a conceptual view illustrating a light intensity distribution of an ideal image with no interference between adjacent unit viewing zones.

Figure 13:
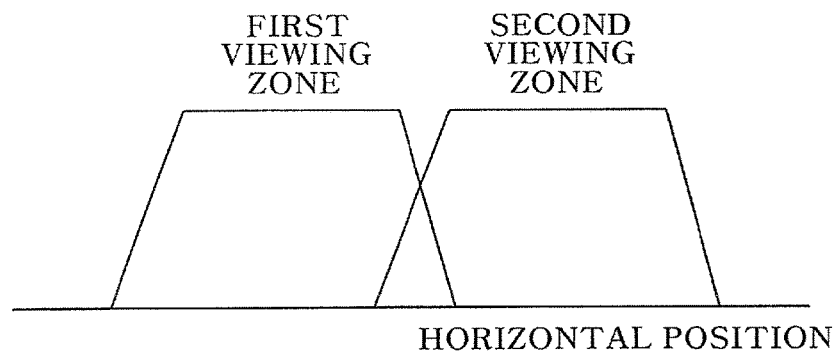

FIG. 13 is a conceptual view illustrating a trapezoidal viewing zone that is intended to be implemented according to an embodiment of the present invention.

Referring to FIGS. 12 and 13, in a light intensity distribution of an ideal image with no interference between adjacent unit viewing zones as shown in FIG. 12, there is an instantaneous viewing zone movement when a horizontal movement is made at a certain viewing position because a boundary between a first viewing zone and a second viewing zone that is adjacent to the first viewing zone is distinct, and a light intensity distribution of each viewing zone is constant within the same viewing zone.

However, there are limitations in implementing the ideal viewing zone, and a partial overlap between adjacent viewing zones may occur as shown in FIG. 13. Comparing with FIG. 1, however, a light intensity of an image in each viewing zone may be formed uniformly.

Figure 1:
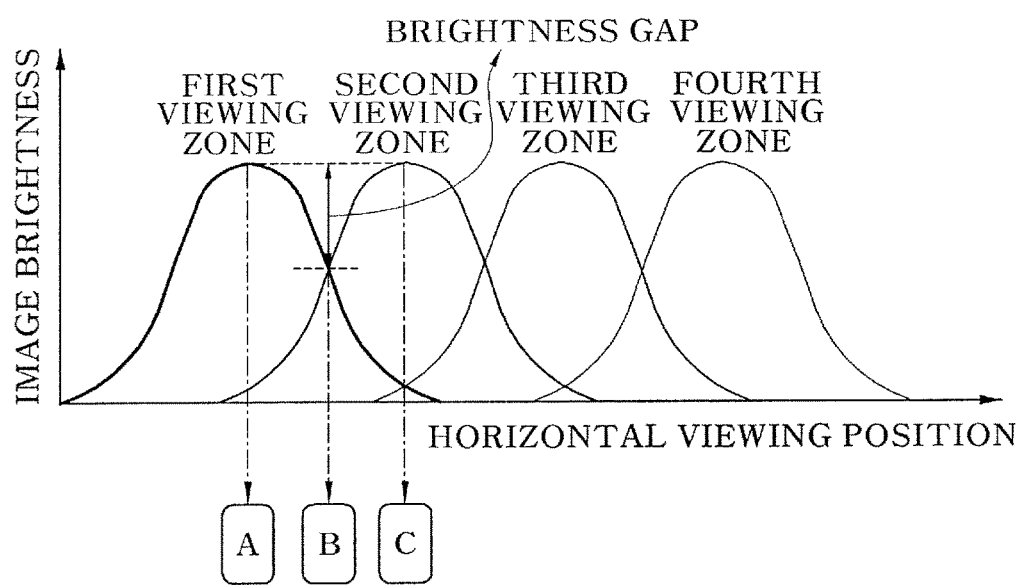
FIG. 1 is a conceptual view illustrating a general viewing zone distribution at an optimum viewing distance (OVD) of a autostereoscopic 3D image display device according to the related art.
Figure 2:
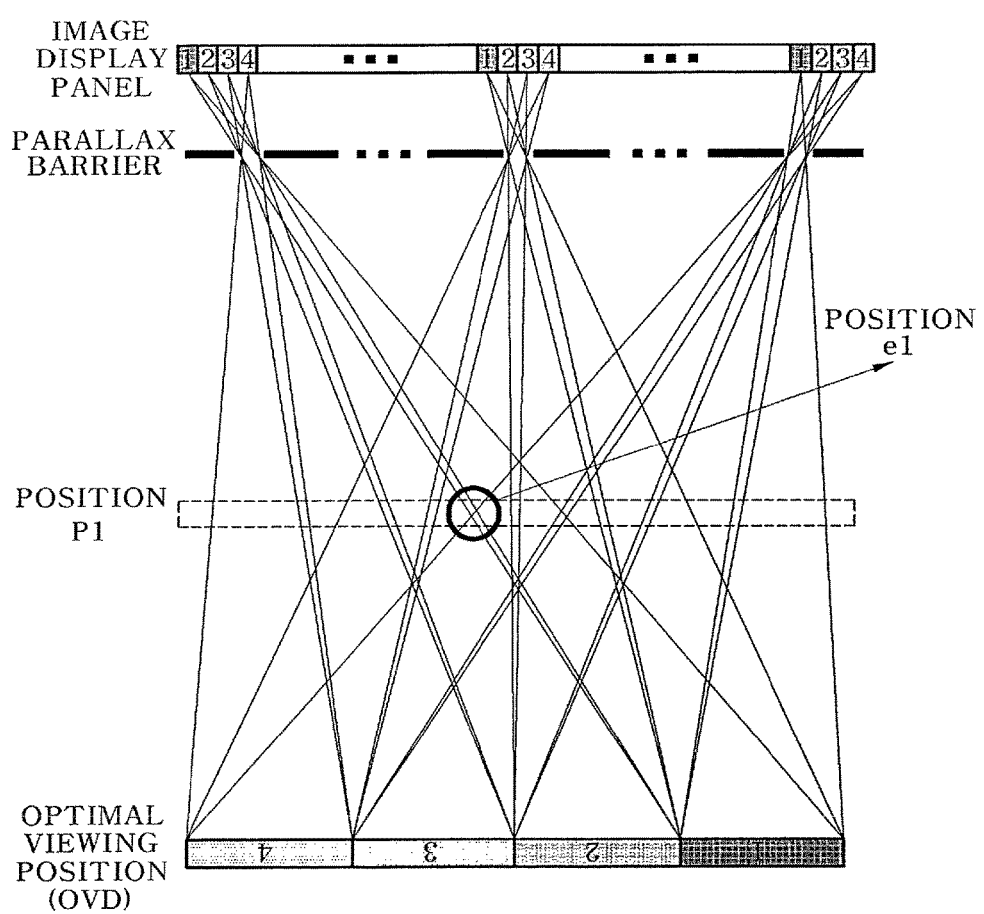
FIG. 2 is a conceptual view illustrating a problem occurring when a viewer moves in a depth direction of a 3D image display device using a parallax barrier according to the related art.

Generally, under the viewing zone as shown in FIG. 1, a viewer is easy to experience crosstalk even at optimum position. Therefore, it is ideal to form a rectangular viewing zone as shown in FIG. 12, but actually it is not easy to form the rectangular viewing zone as shown in FIG. 12. It is possible to form a trapezoidal viewing zone as shown in FIG. 13. In this case, it is possible to reduce crosstalk and maintain the brightness distribution constant in the viewing zone, in comparison to FIG. 1.

The present invention expands a region where a light intensity is uniform, which represents an image within one viewing zone generated by each 3D pixel line as described above and minimizes a region where an overlap between viewing zones of two viewpoints corresponding to the viewer's eye pupils, thus minimizing crosstalk between binocular viewpoints. The viewing zone may be formed by each 3D pixel line to have a shape that is a possibly closest to the shape as shown in FIG. 12 or 13.

Accordingly, a preferred embodiment of the present invention uses a method of adjusting image brightness of viewpoints corresponding to centers of binocular pupils and viewpoint(s) adjacent to the viewpoints, providing the same data as an image that is applied to a corresponding pupil of one of the eyes, and merging the viewpoints.

Figure 14:
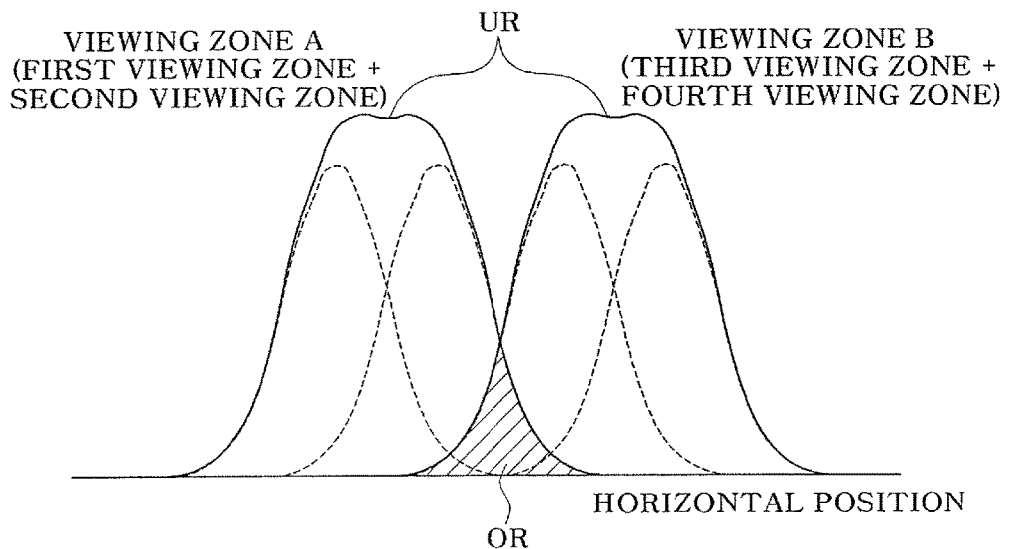
FIGS. 14 to 25 are exemplary views illustrating an integrated viewing zone according to an embodiment of the present invention.
Figure 17:
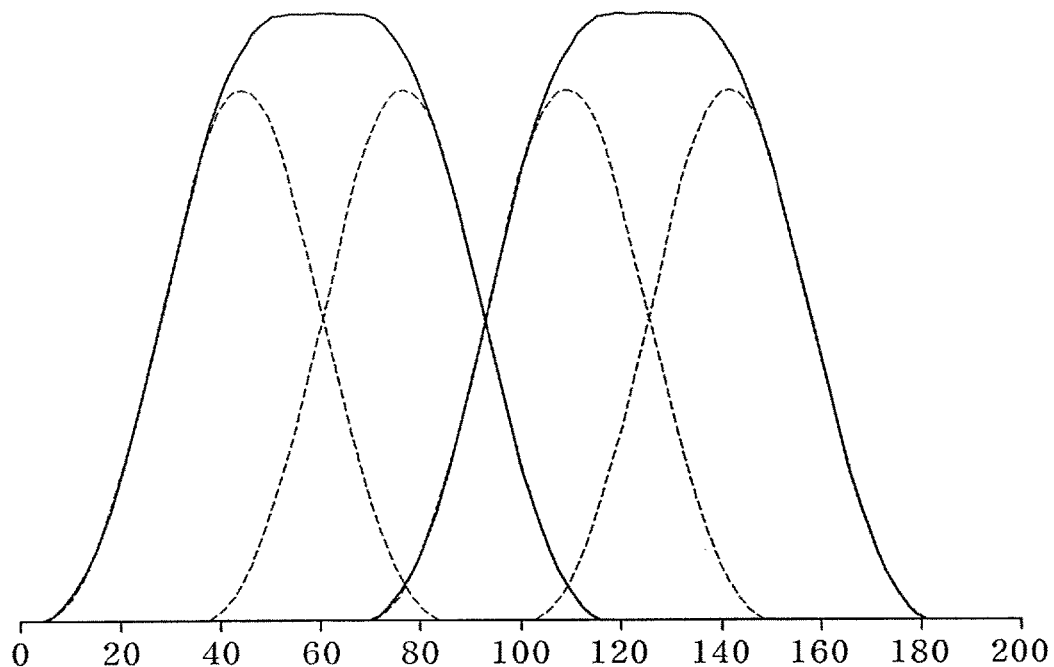
Figure 18:
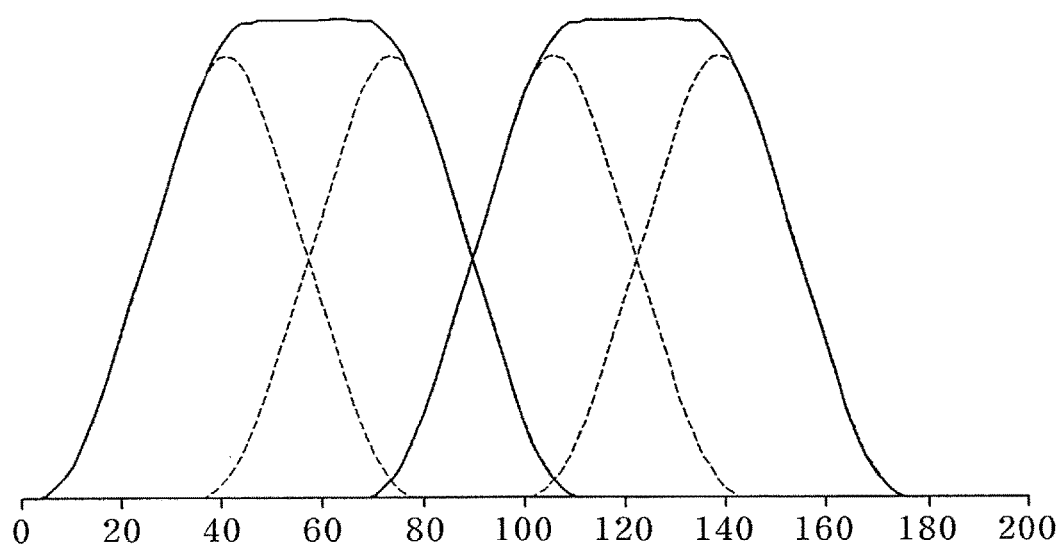

It is possible to enlarge a region where the brightness of viewing zones is flattened, by providing the same image to the viewpoints corresponding to the binocular pupils and the adjacent viewpoint, and performing flattening as shown in FIG. 14, FIG. 17, or FIG. 18 when a brightness weight is applied to viewpoints that provide the same image or the shapes of the viewing zones are simply integrated. Such a method is referred to as viewpoint integration. The viewpoint integration is applied for each 3D pixel line, which is described with reference to FIGS. 10 and 11.

As such, in order to flatten brightness of the viewing zone and minimize crosstalk, a unit viewing zone and brightness adjustment for each viewing zone are applied such that integrated viewing zone is rectangular or substantially rectangular.

Here, the brightness of the display has a Lambertian distribution or the like according to an angle. In this case, brightness adjustment may be performed not to have a brightness slope within viewing zone formed by each integrated viewpoint. The brightness adjustment may be further performed such that brightness difference between each unit viewing zone formed by each integrated viewpoint may not occur.

It is preferable to perform adjustment such that viewpoints included in integrated viewpoints corresponding to a left eye and viewpoints included in integrated viewpoints corresponding to a right eye may not overlap with each other when the viewing zone formed by integrated viewpoints is generated.

The viewpoint integration is selected for each 3D pixel line to configure an entire screen. The selection of the viewpoint is applied similarly even when a viewer moves in a depth direction.

The integrated viewing zone formed by integrated viewpoint is described in detail below with reference to FIGS. 14 to 28.

Figure 25:
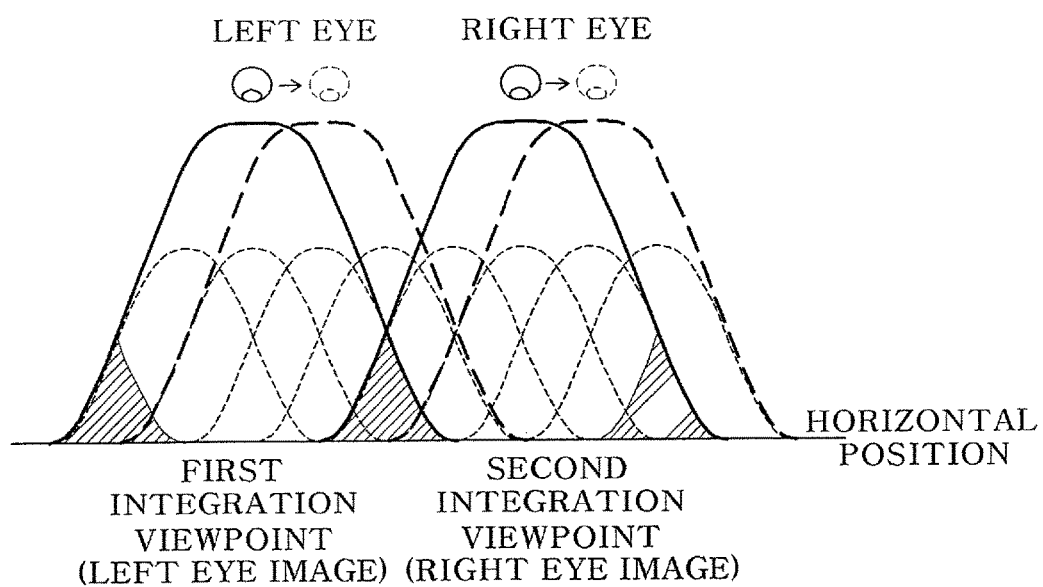

FIGS. 14 and 25 are exemplary views illustrating an expanded viewing zone according to an embodiment of the present invention.

Referring to FIG. 14, as an example, an image signal processing may be performed to input the same image information to two adjacent unit viewing zones, and viewing zones of the two viewpoints may be designed to flatten a central portion when the viewing zones of the two viewpoints generated by the 3D pixel line are combined, thus increasing a region (UR) of a viewing zone having a uniform light intensity for each of the viewing zones of both eyes and decreasing an image overlap region (OR) where crosstalk occurs.

As shown in FIG. 14, viewpoint integration is applied by designing viewing zones of a viewpoint such that a center of the viewing zone may be flattened during the viewpoint integration, with no need to adjust viewpoint brightness change other than overall brightness change such as Lambertian, when a viewing zone corresponding to one eye is generated by integration of an even number of viewpoints. Accordingly, the number of viewpoints that are equally applied to the viewpoint integration is an even number, such as 2, 4, 6, 8, etc.

As shown in FIG. 14, a method of combining two or more adjacent unit viewing zones to form a flattened integrated viewing zone may change depending on the kind of the 3D pixel line.

First, when the 3D pixel line includes an aperture of a parallax barrier and pixels of the image display panel that provides a viewpoint image, an aperture width of the parallax barrier may be adjusted to combine two adjacent unit viewpoints to form an integrated viewing zone and secure uniformity of the integrated viewing zone, as shown in FIG. 14. Detailed conditions and a result for computer simulation are as follows.

<Conditions for Computer Simulation>
Pixel width of image display panel: 0.1 mm
Number of viewpoints: four
Distance between viewpoints: 32.5 mm,
Optimal viewing distance: 1000 mm
Distance between parallax barrier and image display panel: 3.0769 mm
Inclination angle of 3D pixel line (Rad): Tan-1(⅓) Radians.

Figure 15:
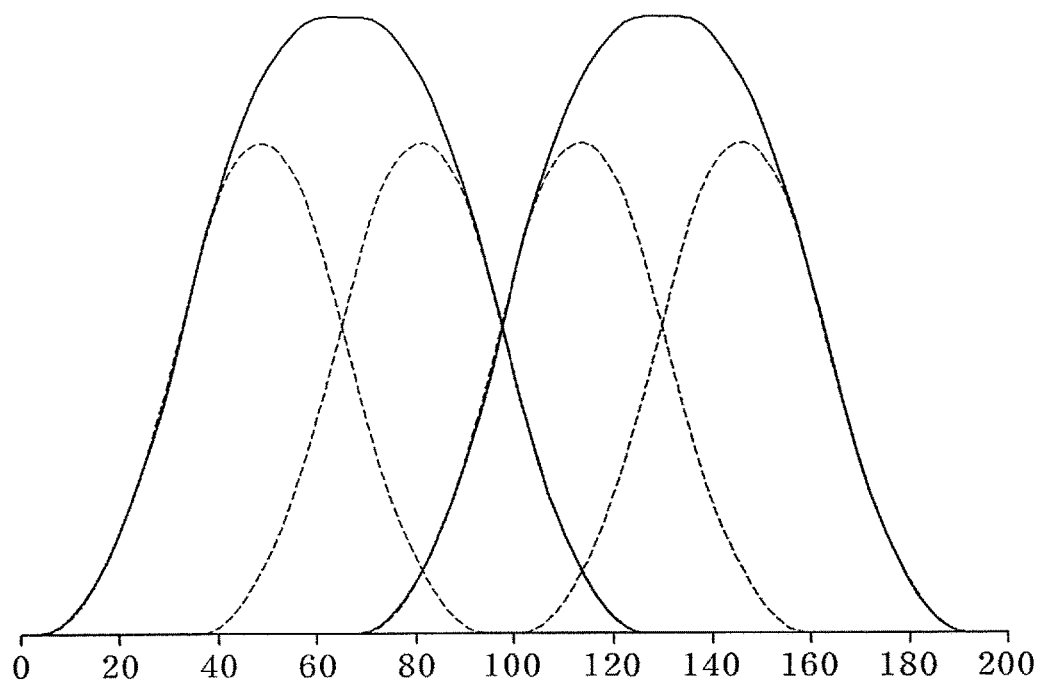
Figure 16:
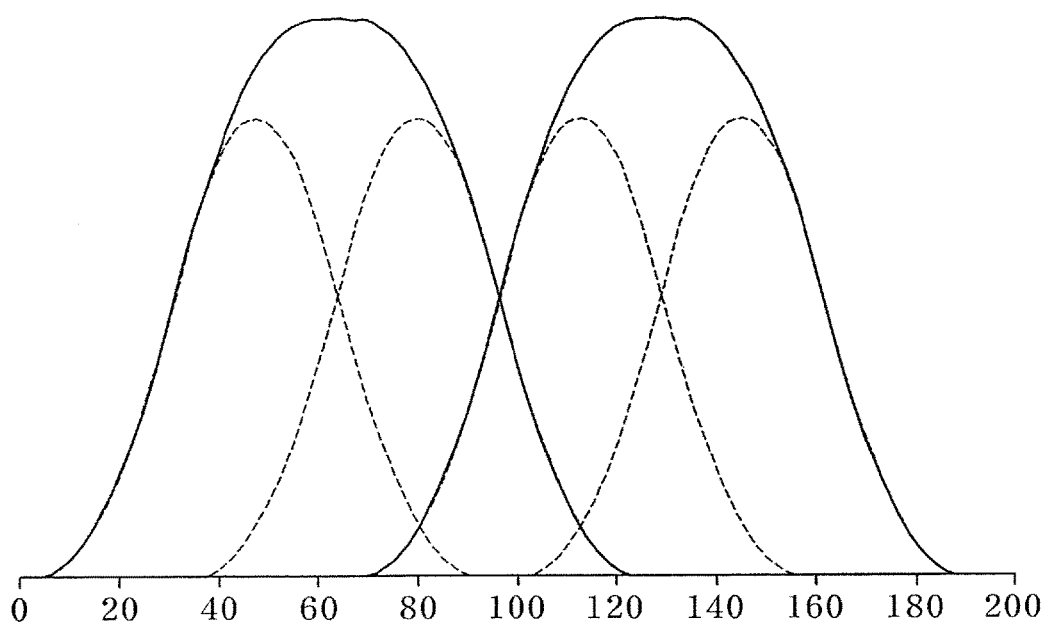
Figure 19:
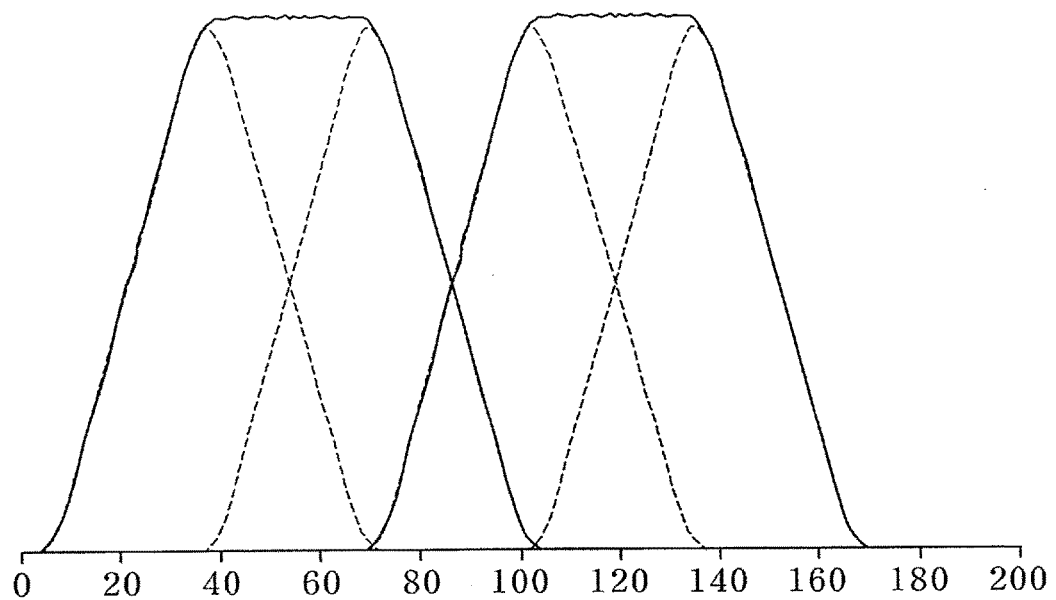

Under the above conditions, FIG. 15 shows that an aperture width of a parallax barrier is 0.0897 mm (typical aperture width). FIG. 16 shows that an aperture width of a parallax barrier is 0.08 mm. FIG. 17 shows that an aperture width of a parallax barrier is 0.06 mm. FIG. 18 shows that an aperture width of a parallax barrier is 0.04 mm. FIG. 19 shows that an aperture width of a parallax barrier is 0.02 mm.

If an aperture width of a parallax barrier constituting the 3D pixel line is less than the typical aperture width (as shown in FIG. 15), it can be seen that a uniform region may be enlarged near a center of a viewing zone where two adjacent viewpoints are integrated.

If a lenticular lens is an element of the 3D pixel line, a uniform region of a integrated viewing zone for each 3D pixel line may increase with change in a focal distance of the lenticular lens. Conditions and a result for computer simulation of the 3D pixel line using the lenticular lens are as follows.

<Conditions for Computer Simulation>
Pixel width of image display panel: 0.1 mm
Number of viewpoints: four
Distance between viewpoints: 32.5 mm,
Optimal viewing distance: 1000 mm
Distance between lenticular lens and image display panel: 3.0769 mm
Inclination angle of 3D pixel line (Rad): Tan-1(⅓) Radians.

Figure 20:
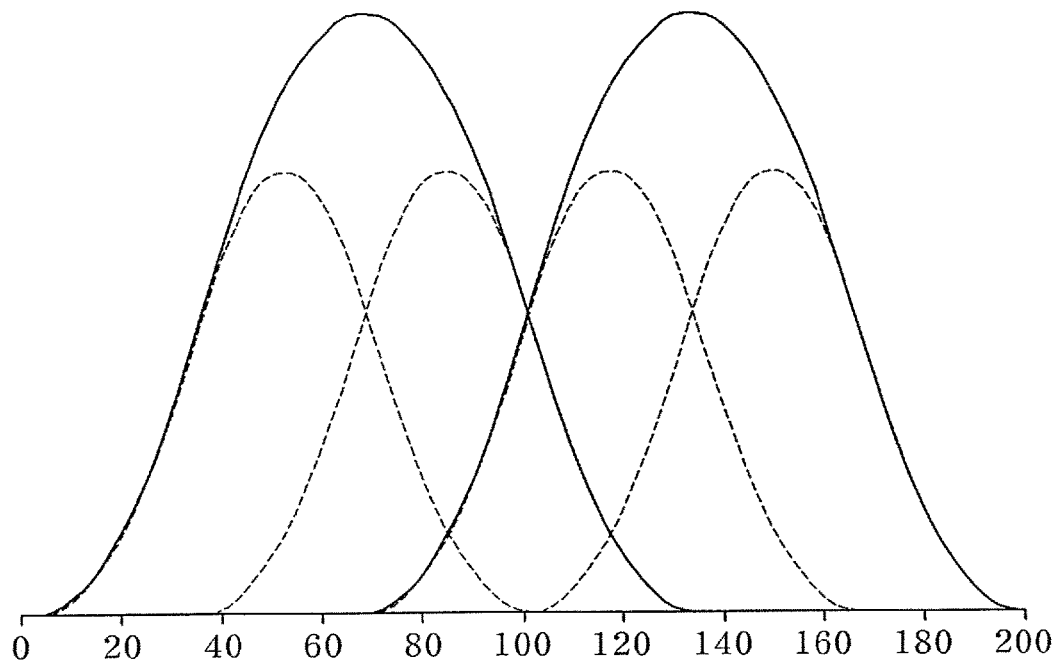
Figure 21:
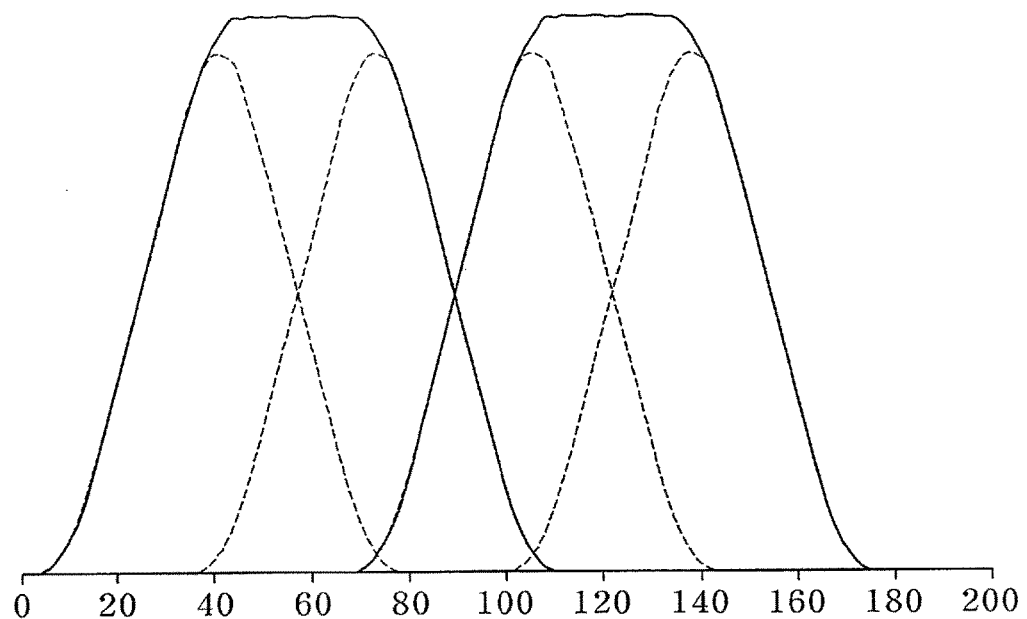
Figure 22:
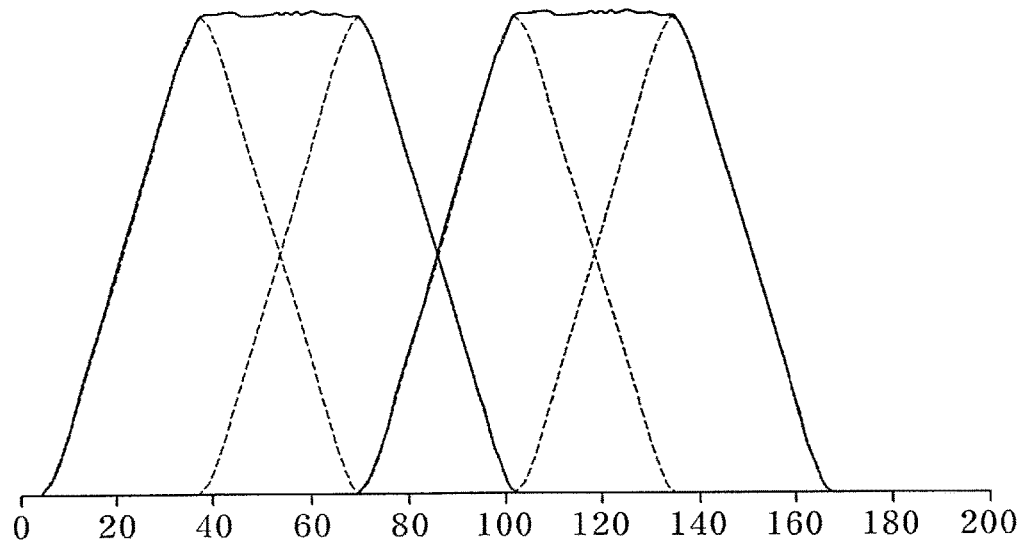
Figure 23:
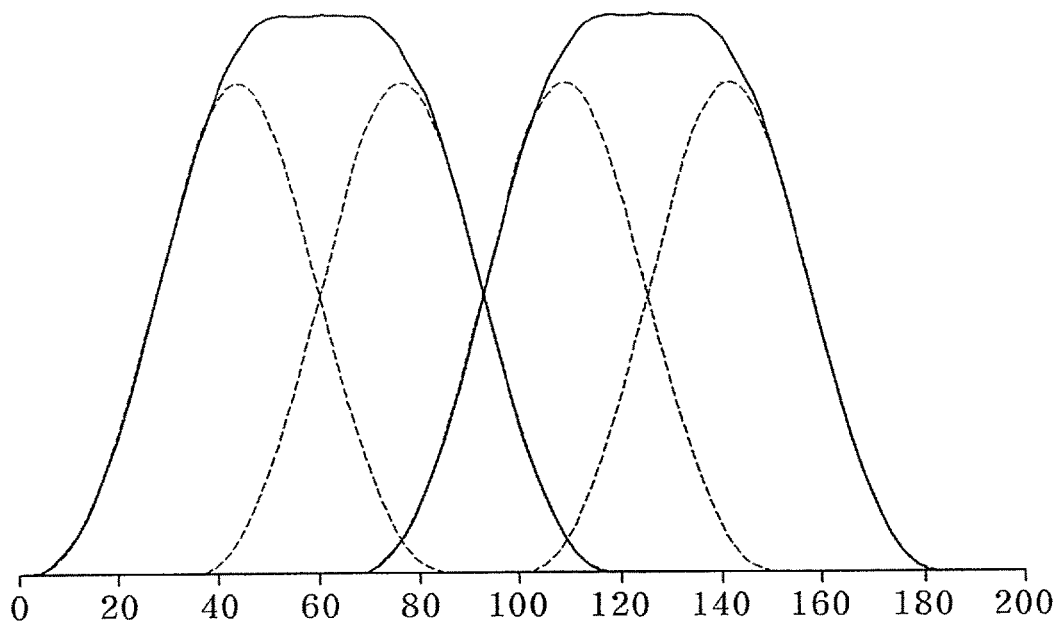
Figure 24:
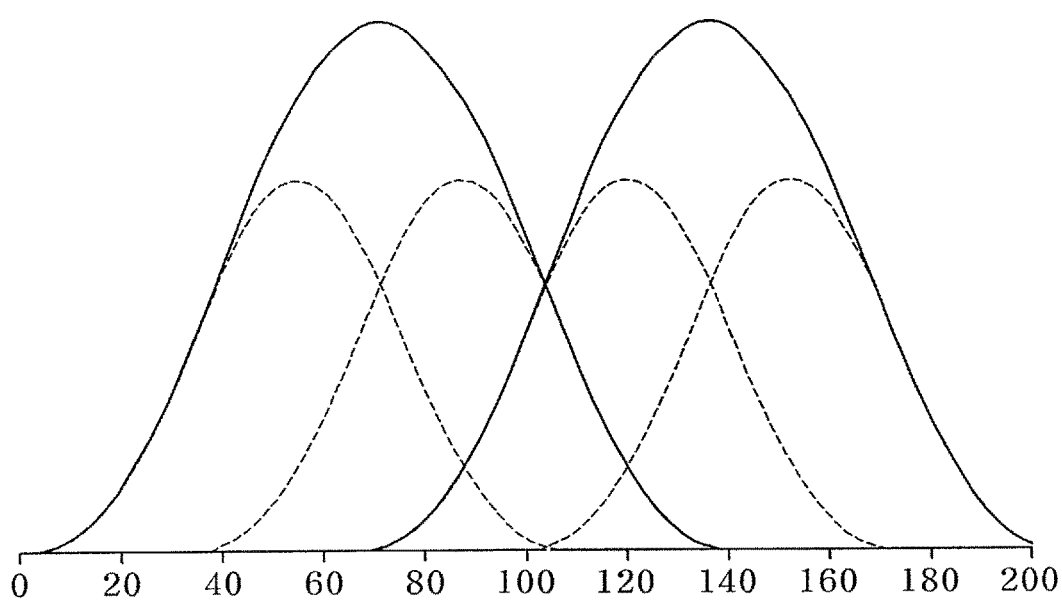

Under the above conditions, FIG. 20 shows that a focal distance of a lenticular lens is 2.4 mm. FIG. 21 shows that a focal distance of a lenticular lens is 2.8 mm. FIG. 22 shows that a focal distance of a lenticular lens is 3.2 mm. FIG. 23 shows that a focal distance of a lenticular lens is 3.6 mm. FIG. 24 shows that a focal distance of a lenticular lens is 4.5 mm.

Referring to FIGS. 20 to 24, it can be seen that a uniform region may be enlarged near a center of a viewing zone where two adjacent viewpoints are integrated by changing a focal distance of a lenticular lens constituting the 3D pixel line. Under the computer simulation conditions, it can be seen that a uniform region of the integrated viewing zone is enlarged when the focal distance of the lenticular lens is similar to a gap between the lens of the lenticular lens and the image display panel and the uniform region of the integrated viewing zone is reduced when the focal distance of the lenticular lens is far from the gap between the lens of the lenticular lens and the image display panel.

The uniform viewing zone of the integrated viewpoint may be enlarged by adjusting a line width of a line light source when the line light source is an element of the 3D pixel line, like adjustment of the aperture of the parallax barrier and adjustment of the focal distance of the lenticular lens.

Figure 27:
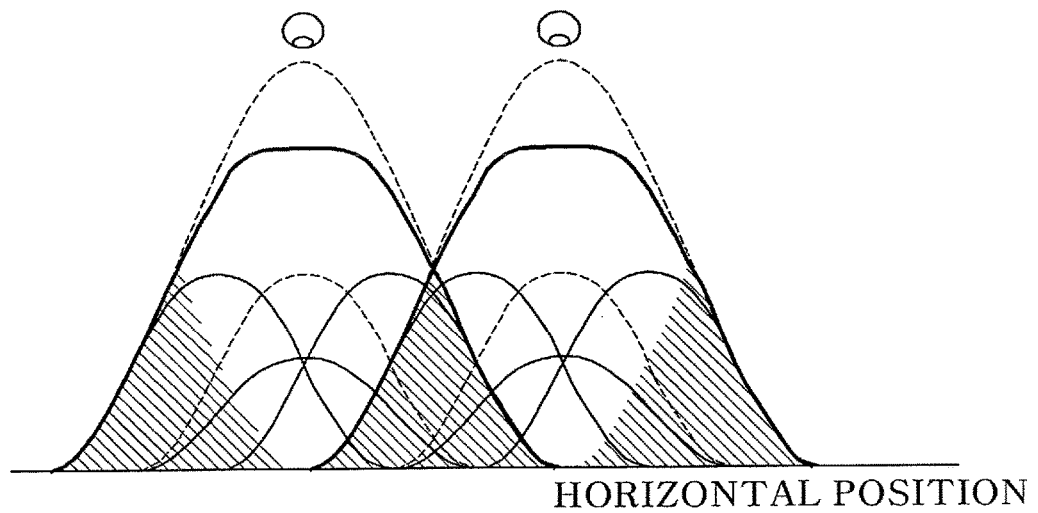
FIG. 27 is a view illustrating an example of integration of an odd number of viewpoints in the expanded viewing zone according to an embodiment of the present invention.

An embodiment of FIG. 25 shows viewing zones of left and right eyes that are formed by combining three unit viewing zones generated by the 3D pixel line. As shown in FIG. 25, the viewing zones of the viewpoints may be designed to flatten a central viewing zone with no brightness adjustment, like viewpoint integration of an initial even number of viewpoints, for flattening viewing zones by viewpoint integration of three viewpoints. As shown in FIG. 27, the flattening may be performed by adjusting brightness of a central one of three viewpoints.

When the number of viewpoints applied to the viewpoint integration is an odd number of 3 or more, flattening may be performed at a center of a viewing zone by not applying brightness change to an odd-numbered viewpoint image from a starting viewpoint applied for viewpoint integration, other than considering entire brightness change such as Lambertian, and by applying brightness change to an even-numbered viewpoint image. This flattening may be individually applied to viewing zone formed by integrated viewpoints corresponding to each eye.

As shown in an example of FIG. 25, when initially pupils of a left eye and a right eye are positioned near centers of viewing zones, respectively (positions of eyes represented in a solid line). When a viewer's eye, for example, is moved to the right by a certain distance (positions of eyes represented in a dotted line), and an initial position of the viewing zone is fixed, crosstalk may be experienced due to an overlap between viewing zones of binocular viewpoints.

The present invention determines a three dimensional moving direction of eyes of an viewer using a viewer position tracking system, performs synchronization with the three dimensional moving direction of the eyes of the viewer, and changes combination of unit viewing zones which are sequentially forming integrated viewing zone of left eye or right eye per each 3D pixel line. Thus, even when the positions of the viewer's eyes moves three-dimensionally, each of the viewer's eyes is positioned near a center of a corresponding integrated viewing zone, and a crosstalk region with an adjacent (integration) viewing zone deviates from each position of the eye. Accordingly, when the eye moves, it is possible not to experience an inverse viewing zone, to minimize crosstalk, and to form a clear 3D image through consecutive motion parallax and a minimal brightness change.

Furthermore, it is also possible to remove a viewpoint image between integrated viewpoints corresponding to both eyes in order to minimize crosstalk. This process is individually applied to each 3D pixel line, and this process is applied using the same principle even when pupils of both eyes are moved in a depth direction.

The pupil position tracking system using a position tracking sensor may be used in a conventional 3D image display device. However, each viewing zone that provides a viewpoint image of each of the viewer's eyes may be implemented by combining two or more unit viewing zones. Thus, the present invention may advantageously form a natural 3D image such that each of the viewer's eyes may be always positioned near a center of a corresponding integrated viewing zone, by adding or subtracting an only unit viewing zone that is positioned outside an integrated viewing zone where viewpoint images of the viewer's eyes are provided when the viewer moves to or from the integrated viewing zone. Further, the consecutive motion parallax may be implemented without rapid parallax change if a parallax image corresponding to an eye is reflected in real time from tracking information according to movement of the eye.

Figure 26A:
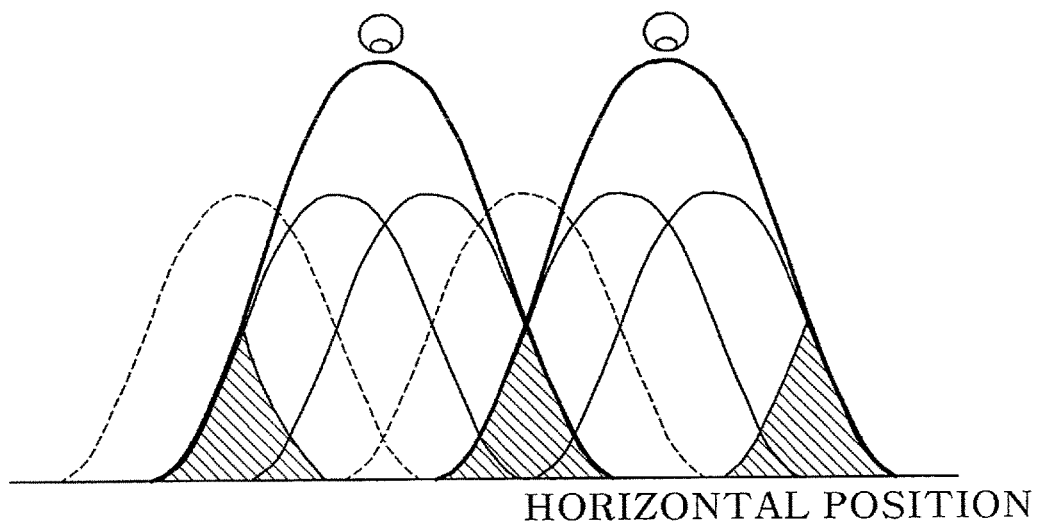
FIGS. 26A and 26B are a view illustrating comparison between a case (A) in which there are one or more viewpoints between binocular integrated viewpoints in the expanded viewing zone and a case (B) in which there is no viewpoint therebetween according to an embodiment of the present invention.
Figure 26B:
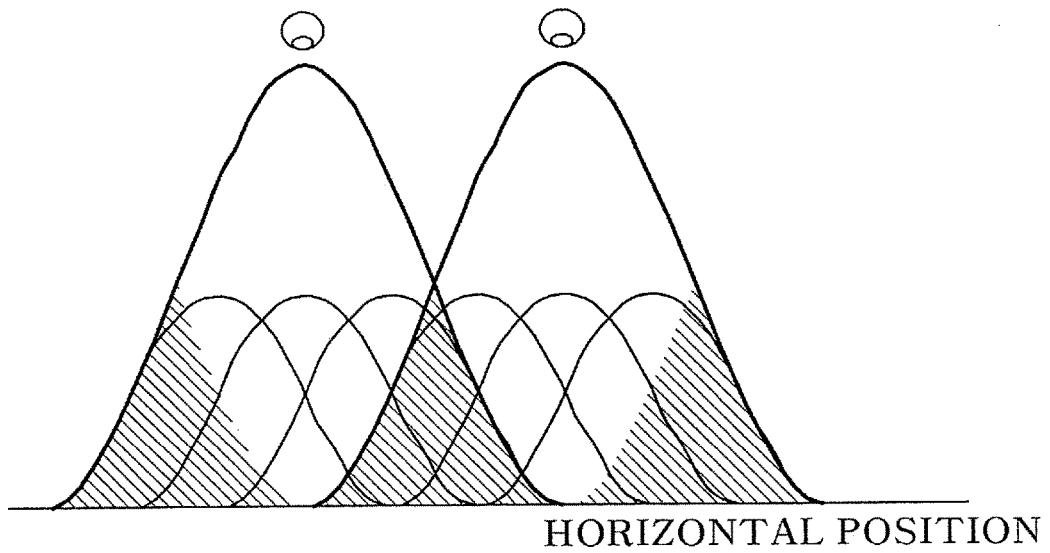

FIGS. 26A and 26B are a view illustrating comparison between a case (A) in which there are one or more viewpoints between binocular integrated viewpoints in the integrated viewing zone and a case (B) in which there is no viewpoint therebetween according to an embodiment of the present invention.

Referring to FIG. 26A, when the total number of viewpoints is six, each of integrated viewpoints corresponding to eyes is formed by combining two viewpoints, and there is one viewpoint between integrated viewpoints. In this case, an amount of crosstalk (a diagonal line part) may be reduced by removing image information from the viewpoint between integrated viewpoints. When there are two integrated viewpoints, if each viewing zone is appropriately designed, an central portion of each viewing zone may be flattened such that a shape obtained by combining two viewing zones may be an approximate trapezoid.

Referring to FIG. 26B, when the total number of viewpoints is six, an integrated viewpoint of each eye is formed by combining three viewpoints, and there is no viewpoint between the integrated viewpoints. Accordingly, the amount of crosstalk is greater when the integrated viewpoint includes three viewpoints than when the integrated viewpoint includes two viewpoints as shown in FIG. 26A.

FIG. 27 is a view illustrating an example of integration of an odd number of viewpoints in the integrated viewing zone according to an embodiment of the present invention, in which an integrated viewpoint of each eye includes three viewpoints.

Referring to FIG. 27, there is no viewpoint between the integrated viewpoints, and uniformity in a viewing zone of each integrated viewpoint may be obtained by reducing image brightness of a central one among three viewpoints constituting the integrated viewpoint. That is, when the number of viewpoints constituting the integrated viewpoint is an odd number of 3 or more, it is preferable to reduce a viewing zone brightness of an even-numbered viewpoint from a starting viewpoint applied to viewpoint integration.

Figure 28:
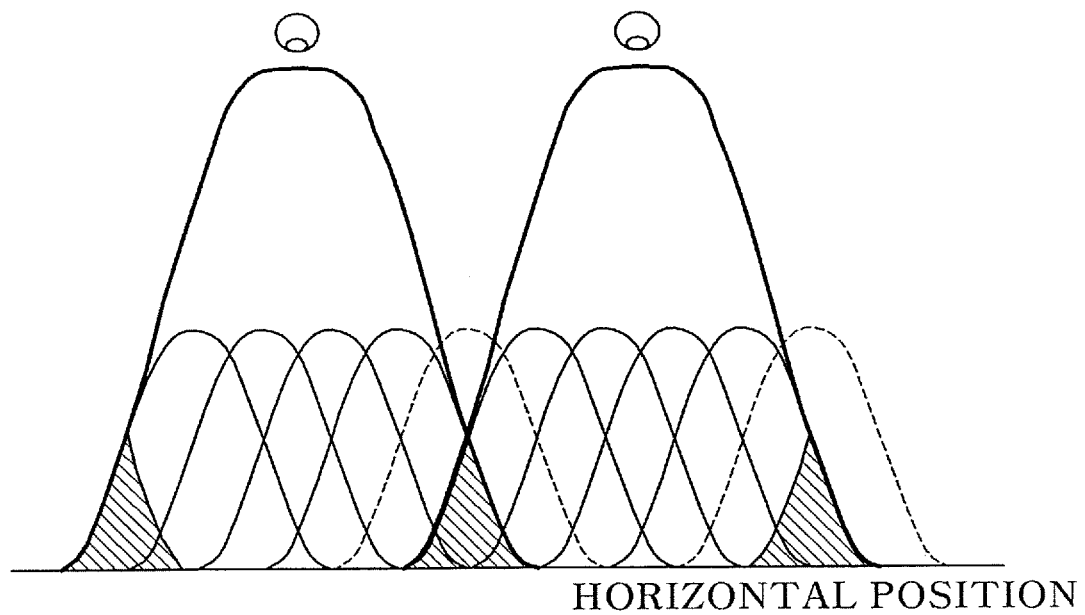
FIG. 28 is a view illustrating an example of integration of an even number of viewpoints in the expanded viewing zone according to an embodiment of the present invention.

FIG. 28 is a view illustrating an example of integration of an even number of viewpoints in the integrated viewing zone according to an embodiment of the present invention, in which an integrated viewpoint of each eye includes four viewpoints.

Referring to FIG. 28, there is one viewpoint between the integrated viewpoints, and it is possible to reduce an amount of crosstalk by removing an image of the viewpoint between the integrated viewpoints. Further, the four viewpoints constituting the integrated viewpoint have the same brightness, and uniformity in a viewing zone of each integrated viewpoint may be secured by designing a shape of a viewing zone of each viewpoint as shown in FIG. 14 to be flattened when integrated and controlling an amount of overlap between viewpoint images.

Moreover, the control portion 120 of FIG. 9 may define a limit in the amount of movement in a depth direction in consideration of the degree in which a width of a viewing zone corresponding to each viewpoint is reduced when changing to the depth direction, and provide an additional viewpoint corresponding to a width of a total viewing zone that is reduced when changing to the depth direction, thus controlling the number of viewpoints for the integrated viewpoint and minimizing crosstalk even when moving in the depth direction.

That is, the control portion 120 may change the number of viewpoints constituting each of a first integrated viewpoint and a second integrated viewpoint such that a width of an integrated viewing zone of the integrated viewpoint may be kept constant, in consideration of a rate of reducing a width of a unit viewing zone that is formed by one viewpoint at a closest distance between a viewer and the 3D image display device 100.

Figure 29:
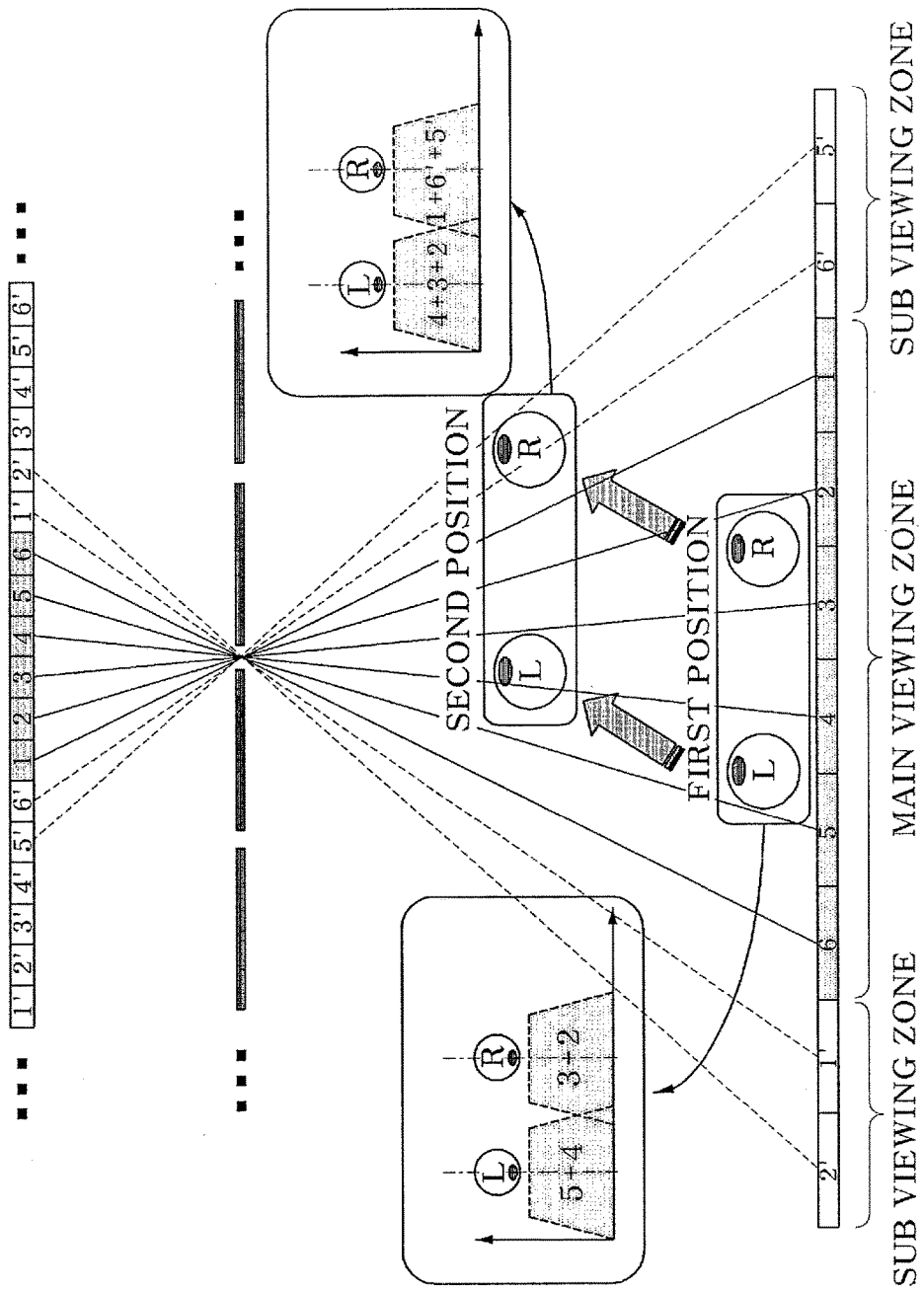
FIGS. 29 and 30 are views illustrating a case in which one viewer moves in a depth direction in a multi-view 3D image display device according to an embodiment of the present invention.
Figure 30:
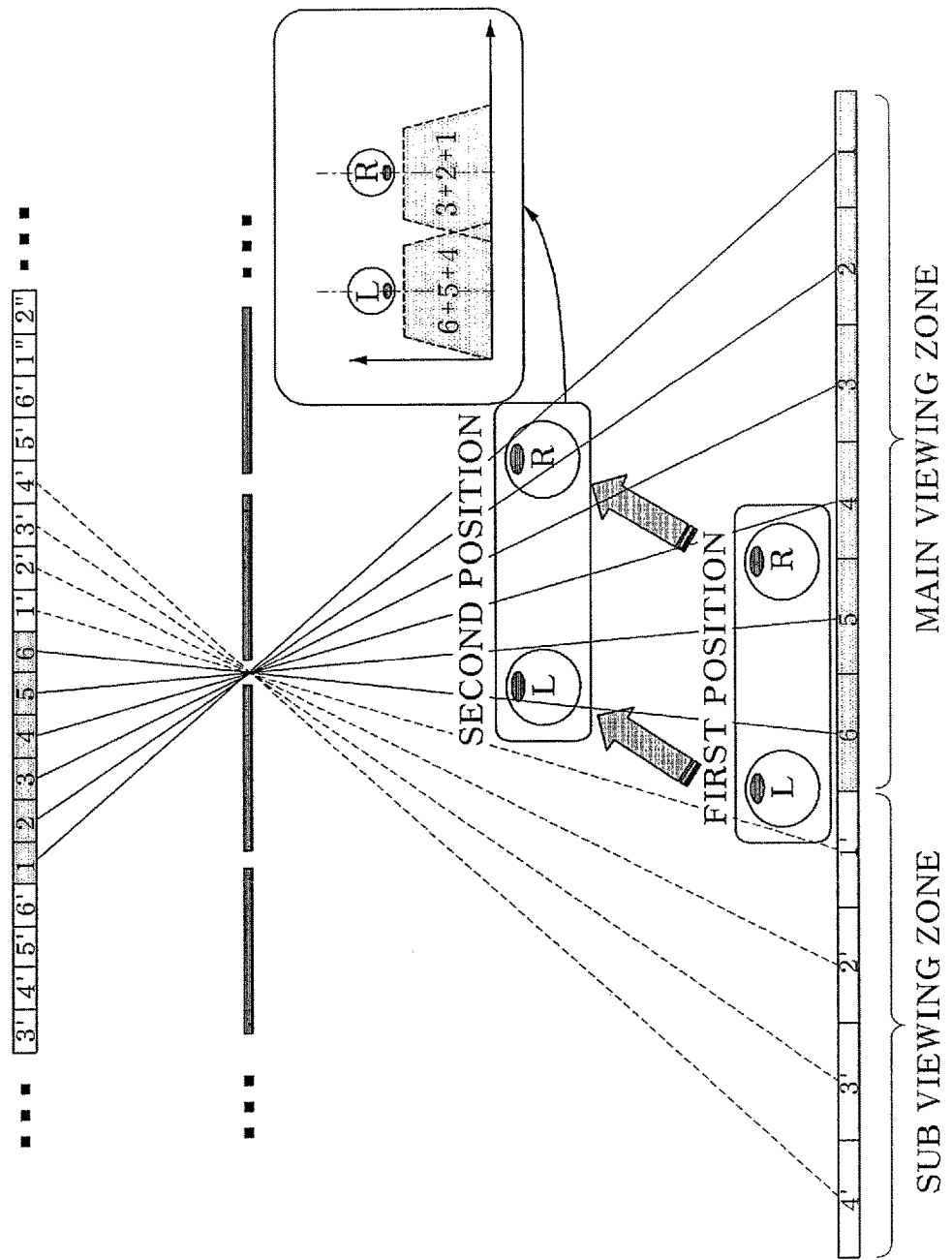

FIGS. 29 and 30 are views illustrating a method of applying viewpoint integration for each 3D pixel line in consideration of positions of eyes of one viewer when the viewer moves in a depth direction according to an embodiment of the present invention.

Referring to FIGS. 29 and 30, when the viewer moves back and forth from an optimal depth, a distance between viewpoints is increased or decreased. When the viewer approaches a display, the distance between viewpoints is decreased and thus the number of needed viewpoints increases in consideration of the binocular distance. However, a method of using viewing zones of viewpoints generated by 3D pixel lines to form a flattened viewing zone and minimizing crosstalk when a position is moved may be applied in the same way.

As an example, FIG. 29 is a view illustrating a case in which a distance between binocular viewpoints at an optimal viewing distance is two viewpoints, using a 3D image display device using a parallax barrier that is designed with six viewpoints. In this case, when a viewer near an optimal viewing distance is positioned at a first position, it is possible to provide a binocular viewpoint image that is flattened and has minimal crosstalk by providing the same viewpoint image to a fourth viewpoint and a fifth viewpoint to form an integrated viewing zone where the viewpoints are integrated, providing the same viewpoint image to a second viewpoint and a third viewpoint to form an integrated viewing zone where the viewpoints are integrated, and providing a left eye image and a right eye image of the viewer, respectively. In this case, a first viewpoint image and a sixth viewpoint image, which are not used as the binocular viewpoint, may be removed. When the viewer moves by a certain distance in a depth direction and is positioned at a second position, considerations for minimizing crosstalk and forming a viewing zone having uniform brightness, like at an optimal viewing distance, are as follows. First, when the viewer moves in a depth direction from the optimal viewing distance, a distance between viewpoints that is designed at the optimal viewing distance decreases, integration of two viewpoints is insufficient for each eye of the viewer. In this case, the above problem may be solved by forming the binocular viewpoint by integrating three viewpoints using an additional viewpoint at the optimal viewing distance. When the viewer is positioned at the second position of FIG. 29, the viewer's eyes are positioned in a uniform region of a viewing zone generated by the binocular viewpoint formed by integrating three viewpoints. Second, the integration viewpoint of each of positions of the viewer's eyes is formed by using a sub viewing zone and a main viewing zone together or changing a combination of pixels constituting a 3D pixel line such that the viewer's eyes may be always in the main viewing zone. FIG. 29 is a view illustrating a method of forming binocular viewpoints of the viewer by, when a viewer is positioned at a second position, providing the same image to a second viewpoint, a third viewpoint, and a fourth viewpoint and providing the same image to a first viewpoint, and firth and sixth viewpoints of the sub viewing zone such that the viewer's eyes may be positioned near a center of the integrated viewing zone. In addition, the present invention may change a position where a viewing zone is formed according to a viewer's position for each 3D pixel line, and as shown in FIG. 30, when a viewer is positioned at a second position, appropriately select pixels constituting the 3D pixel line along with an aperture such that the viewer's eyes may be in the main viewing zone. In this case, the present invention may provide the same image to the fourth to sixth viewpoints to form an integrated viewing zone at a position of the viewer's left eye and provide the same image to the first to third viewpoints to form an integrated viewing zone at a position of the viewer's right eye, thus provide an integrated viewpoint for each binocular viewpoint while allowing the viewer to be always positioned in the main viewing zone of the 3D pixel line.

If the method is applied to a case in which four or more viewpoints are needed for viewpoint integration, a viewpoint and a viewing zone may be designed to previously provide a needed number of viewpoints to each eye, thereby minimizing crosstalk and keeping the image brightness of the viewing zone flattened even when moving in a depth direction.

The pupil position tracking system 110 of FIG. 9 according to a preferred embodiment of the present invention may track positions of a plurality of viewers and track a position of each of pupils to deliver the number of viewers and information about pupils of the viewers to the control portion 120.

Furthermore, the present invention may select viewpoints closest to the centers of the plurality of viewers' eye pupils for each viewing zone of the viewpoint that is formed for each 3D pixel line, through the control portion 120, by using 3D information about the positions of the plurality of viewers that is tracked in real time by the pupil position tracking system 110, integrate one or more adjacent viewpoints for each of the selected viewpoints, and provide a viewing zone formed by the integrated viewpoint to each of the plurality of viewer's eyes. Thus, it is possible to provide a viewing zone having minimal crosstalk and uniform brightness distribution to the plurality of viewers.

Figure 31:
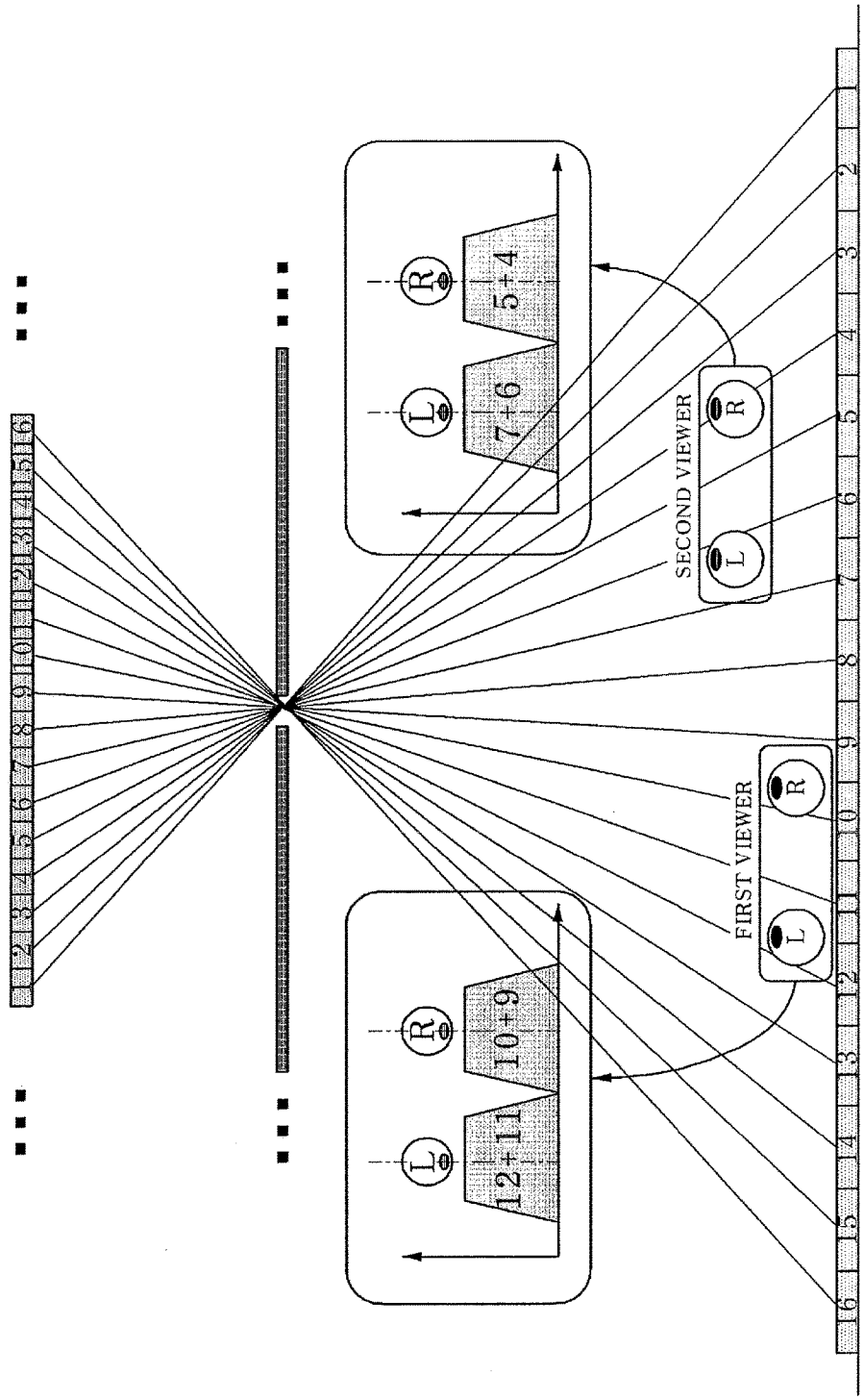
FIG. 31 is a view illustrating a case in which a flattened integrated viewpoint is assigned to each of two viewers in a multi-view 3D image display device according to an embodiment of the present invention.

FIG. 31 is a view illustrating a case in which a flattened viewpoint is assigned to each of two viewers in a multi-view 3D image display device according to an embodiment of the present invention, in which a binocular viewpoint for each viewer is formed by integrating two unit viewpoints and each viewer uses four unit viewpoints. As a result, both eyes of each of two viewers may be positioned in a uniform viewing zone that is formed by integrated viewpoints at positions of both eyes, thereby allowing a viewer to view a viewpoint image having minimal crosstalk and uniform brightness. This method may also be applied in the same way to a case in which there are three persons. A method of allocating a flattened viewpoint to a plurality of viewers, which has been described with reference to FIG. 31, may be applied even to a case in which the plurality of viewers move in a depth direction.

FIGS. 29 and 31 illustrate as an example that a distance between the viewer's eyes is set to be a distance between two unit viewpoints at an optimal viewing distance and a binocular viewpoint at an optimal viewing distance is formed by integrating two viewpoints. However, the distance between the viewer's eyes may be set to be a distance between three or more unit viewpoints at an optimal viewing distance and a binocular viewpoint at an optimal viewing distance may be formed by integrating three or more viewpoints.

In addition, although an embodiment of the present invention has been described using only a multi-view 3D image display device using a parallax barrier as an example, the concept of the present invention is applicable to various glass-free 3D image display devices for forming a viewing zone by viewpoint images of an image display panel on a space, such as a multi-view 3D image display device using a lenticular lens.

Figure 32:
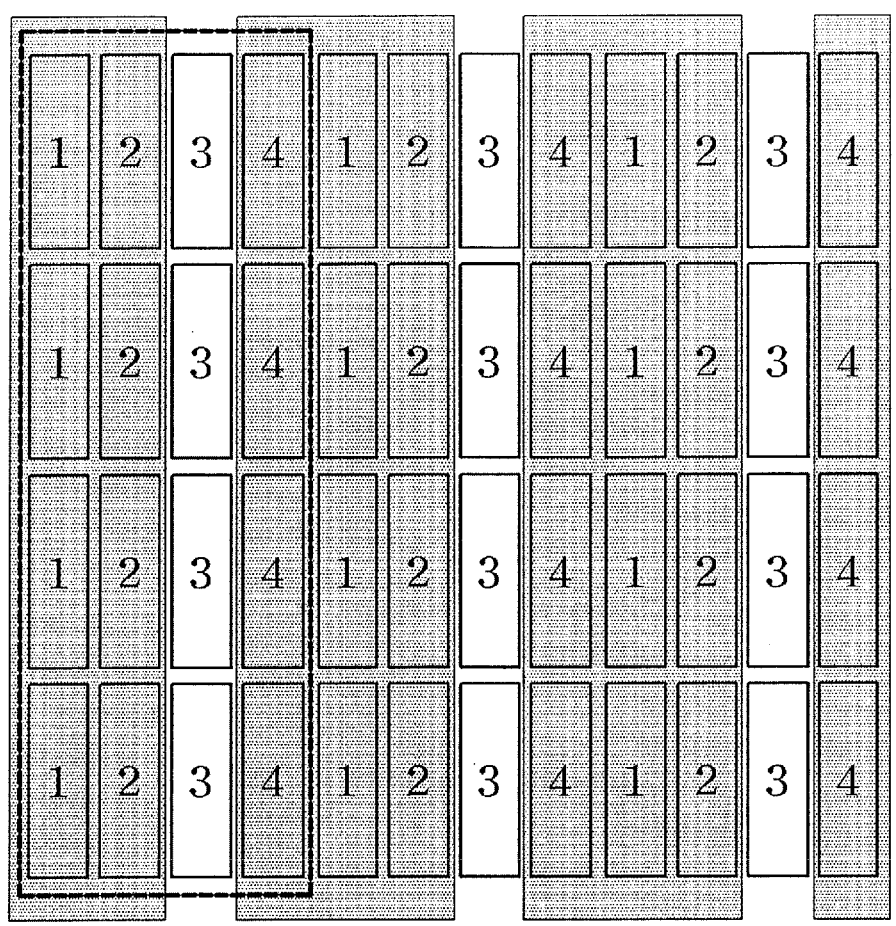
FIG. 32 is a conceptual view two-dimensionally illustrating the image display panel of FIG. 10 and a parallax barrier formed in a front of the image display panel.
Figure 33:
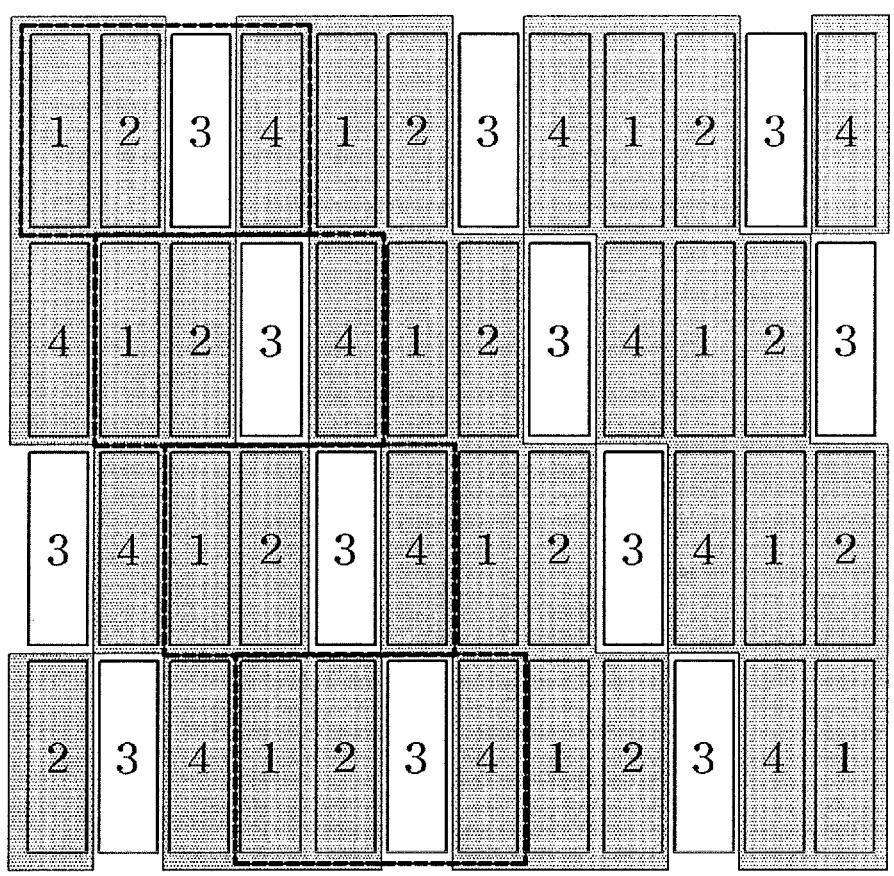
FIG. 33 is a conceptual view illustrating an example in which a concept of the present invention may be applied to a discontinuous 3D pixel line for each pixel of a row.

Also, as shown in FIGS. 10 and 11, in an embodiment of the present invention, an aperture of the parallax barrier that is positioned on an upper surface of the image display panel continuously extends to a lower surface of the image display panel to have a linear 3D pixel line. However, the embodiment of the present invention may not be limited to the continuous linear 3D pixel line. FIG. 32 is a view two-dimensionally illustrating a liquid crystal display panel of FIG. 10 and a parallax barrier that is formed in a front of the liquid crystal display panel. As shown in FIG. 32, when apertures are continuously arranged from top to bottom, pixels that constitute the 3D pixel line and make a pair with each aperture are represented in a dotted line on the drawing. Although not shown in the drawing, apertures and four adjacent pixels that are positioned in a right-side with respect to the dotted line form a 3D pixel line in a continuous linear shape from top to bottom. The line is referred to as the 3D pixel line, considering a minimal unit for forming a viewing zone in a continuous linear shape. However, the concept of the present invention is not used only to the typical linear shape and may be applied to a discontinuous 3D pixel line for each pixel of a row, as shown in FIG. 33. The pixels within a dotted line and an aperture of a parallax barrier are a basic unit to form a viewing zone at a viewing position, and the basic unit is shifted to the right by a size of one sub-pixel for each pixel of a row. In this case, it is possible to minimize crosstalk and secure uniform brightness by controlling a viewpoint image for each 3D pixel line according to a position of a viewer according to an embodiment of the present invention. However, as a position of an aperture moves horizontally by a certain distance for each row of pixels (in this case, a horizontal movement by a size of one sub-position), only a case in which a discontinuous 3D pixel line is formed for each row is different from the above embodiment. In this case, the basic unit for forming a viewing zone is not in a continuous line. Therefore, using the term a 3D pixel point, instead of a 3D pixel line is preferable. FIG. 33 shows a case in which the substantially same inclined viewing zone as that of FIG. 11 is formed. Further, the present invention uses only a regular 3D pixel line or 3D pixel point as an embodiment. However, the concept of the present invention may be used in a 3D pixel line or 3D pixel point having an unlimited shape.

A method of displaying a multi-view 3D image, which is performed by a 3D image display device according to an embodiment of the present invention, will be described below.

The 3D image display device according to an embodiment of the present invention includes an image display panel that displays a 3D image, a control portion that controls a viewing image of each 3D pixel line that provides multiple viewpoints of 4 or more, and a position tracking system for a viewer's eye pupils. First, the 3D image display device obtains three dimensional coordinate values of the positions of the viewer's eye pupils through the position tracking system for the viewer's eye pupils. Subsequently, the 3D image display device selects a first viewpoint and a second viewpoint that are closest to centers of the viewer's eye pupils for each viewing zone of a viewpoint formed for each 3D pixel line by using a three dimensional coordinate value of a position of the viewer' eye pupil, using the three dimensional coordinate values of the positions of the viewer's eye pupils which are obtained from the pupil position tracking system through the control portion. The 3D image display device provides a viewpoint image of one of the viewer's eyes to a first viewpoint and provides a viewpoint image of the other of the viewer's eyes to a second viewpoint.

In particular, the present invention may further include providing a viewpoint image of the first viewpoint to one or more viewpoints adjacent to the first viewpoint to form a first integrated viewpoint and providing a viewpoint image of the second viewpoint to one or more viewpoints adjacent to the second viewpoint to form a second integrated viewpoint.

Moreover, the present invention adjusts brightness of each of the viewpoints constituting the first or second integrated viewpoint through the control portion to flatten brightness of a central portion of each of integrated viewing zones formed by the first integrated viewpoint and the second integrated viewpoint. It is preferable to flatten a central portion of an integrated viewpoint viewing zone by allowing brightness of viewpoints constituting the integrated viewpoint and adjusting a shape of the viewpoint viewing zone through design change if the number of viewpoints constituting the first or second integrated viewpoint is an even number of 2 or more, and to flatten a central portion of an integrated viewpoint viewing zone by reducing brightness of a viewing zone of an even-numbered viewpoint from a starting viewpoint among the viewpoints constituting each of the integrated viewpoints if the number of viewpoints constituting the first or second integrated viewpoint is an odd number of 3 or more. An detailed description of the viewpoint integration is the same as the above description with reference to FIGS. 14 to 28, and thus is applied the same to a method of displaying a multi-view 3D image that is performed by the 3D image display device according to an embodiment of the present invention.

While the multi-view 3D image display device and method using dynamic viewing zone expansion applicable to a plurality of viewers according to preferred embodiments of the present invention have been described, the present invention is not limited thereto, various modifications may be made therein, and the appended claims are intended to cover all such modifications which may fall within the spirit and scope of the invention.

The invention claimed is:

1. A multi-view 3D image display device comprising:
    an image display panel configured to display a 3D image;
    a control portion configured to control a viewpoint image of each of 3D pixel lines; and
    a viewer eye pupil position tracking system,
    wherein the 3D pixel line is configured to provide multiple, at least four, viewpoints, and
    the control portion is configured to,
        select a first viewpoint and a second viewpoint that are close to a viewer's eye pupils for a viewing zone of a viewpoint for each 3D pixel line by using three dimensional coordinate values of positions of the viewer's eye pupils determined by the viewer eye pupil position tracking system,
        provide a viewpoint image of one of the viewer's eyes to the first viewpoint, and
        provide a viewpoint image of another of the viewer's eyes to the second viewpoint,
    wherein the control portion is further configured to provide the viewpoint image of the first viewpoint to a first number of one or more viewpoints adjacent to the first viewpoint to form a first integrated viewpoint and provide the viewpoint image of the second viewpoint to a second number of one or more viewpoints adjacent to the second viewpoint to form a second integrated viewpoint, and
    the control portion is further configured to, in response to moving of the viewer in a depth direction, control at least one of the first integrated viewpoint and the second integrated viewpoint by increasing or reducing at least one of the first number and the second number based on an amount of movement of the viewer in the depth direction.

2. The multi-view 3D image display device of claim 1, wherein the image display panel is further configured to display a 3D image by using a parallax barrier or lenticular lens that is a parallax separation means, or a line light source.

3. The multi-view 3D image display device of claim 2, wherein the 3D pixel line is formed by an aperture of the parallax barrier, the lenticular lens, or the line light source, and pixels on the image display panel for providing viewpoint images.

4. The multi-view 3D image display device of claim 1, wherein the image display panel comprises:
    a plurality of pixels;
    a parallax separator, the parallax separator being,
        a parallax barrier including a plurality of apertures, or
        a lenticular lens including a plurality of lenses; and
    a plurality of 3D pixel lines, each of the plurality of 3D pixel lines including, one or more pixels from among the plurality of pixels, and at least one of,
        an aperture from among the plurality of apertures of the parallax barrier, or
        a lens from among the plurality of lenses of the lenticular lens.

5. The multi-view 3D image display device of claim 4, wherein
    the control portion is further configured to adjust brightness of each of the viewpoints constituting the first or second integrated viewpoint to flatten brightness of a central portion of each of integrated viewing zones formed by the first integrated viewpoint and the second integrated viewpoint.

6. The multi-view 3D image display device of claim 4, wherein
    the control portion is further configured to flatten brightnesses of central portions of each of first and second integrated viewing zones corresponding, respectively, to the first and second integrated viewpoints by adjusting at least one of a width of a first aperture, a focal length of a first lens, or a line width of a line light source, the first aperture being an aperture from among the plurality of apertures, the first lens being a lens from among the plurality of lenses.

7. The multi-view 3D image display device of claim 5, wherein
    when a number of viewpoints constituting the first or second integrated viewpoint is an odd number of three or more,
    the control portion is further configured to flatten a central portion of an integrated viewpoint viewing zone by reducing viewing zone brightness of an even numbered viewpoint from a starting viewpoint among viewpoints constituting an integrated viewpoint.

8. The multi-view 3D image display device of claim 4, wherein
    when there is at least one intermediate viewpoint between the first integrated viewpoint and the second integrated viewpoint,
    the control portion is further configured to remove image data of the at least one intermediate viewpoint to minimize crosstalk.

9. The multi-view 3D image display device of claim 4, wherein
    the control portion is further configured to define a limit in an amount of movement in the depth direction in consideration of a degree in which a width of a viewing zone corresponding to each viewpoint is reduced when a viewer moves in the depth direction, and provide an additional viewpoint corresponding to a width of a total viewing zone that is reduced when changing to the depth direction, thus controlling numbers of viewpoints for each of the first and second integrated viewpoints and minimizing crosstalk even when moving in the depth direction.

10. The multi-view 3D image display device of claim 4, wherein the first integrated viewpoint and the second integrated viewpoint are formed after the pixels constituting the 3D pixel line are set by using viewer eye position information determined by the viewer eye pupil position tracking system, such that eyes of the viewer are included in a main viewing zone.

11. The multi-view 3D image display device of claim 4, wherein each of the first integrated viewpoint and the second integrated viewpoint includes viewpoints of a main viewing zone and viewpoints of a sub viewing zone that does not overlap with the main viewing zone.

12. The multi-view 3D image display device of claim 4, wherein, when the viewer moves in the depth direction, the control portion is further configured to change a number of viewpoints constituting each of the first integrated viewpoint and the second integrated viewpoint such that a width of an integrated viewing zone of each of the first integrated viewpoint and the second integrated viewpoint is kept constant, in consideration of a rate of decreasing a width of a unit viewing zone that is formed by one viewpoint at a closest distance from the 3D image display device or a rate of increasing a width of a unit viewing zone that is formed by one viewpoint at a farthest distance from the 3D image display device.

13. The multi-view 3D image display device of claim 1, wherein the viewer eye pupil position tracking system is further configured to track positions of a plurality of viewers and tracks positions of eye pupils of each of the plurality of viewers to deliver information about a number of viewers and positions of the eye pupils of the plurality of viewers to the control portion.

14. The multi-view 3D image display device of claim 13, wherein the control portion is further configured to, select viewpoints closest to centers of eye pupils of the plurality of viewers for each viewing zone of the viewpoint that is formed for each 3D pixel line by using 3D information about positions of viewers' eye pupils that are tracked in real time by the viewer eye pupil position tracking system, integrate one or more adjacent viewpoints for each of the selected viewpoints, and provide a viewing zones formed by the first and second integrated viewpoints to eyes of each of the plurality of viewers.

15. The multi-view 3D image display device of claim 14, wherein when there is at least one intermediate viewpoint between integrated viewpoints provided to the plurality of viewers' eyes, the control portion is further configured to remove image data of the at least one intermediate viewpoint to minimize crosstalk.

16. The multi-view 3D image display device of claim 1, wherein the 3D pixel line has a length equal to or greater than a size of one pixel unit, and equal to or less than a sum of sizes of pixels for displaying a viewpoint image, thus giving an effect of a 3D pixel point.

17. A method of displaying a multi-view 3D image using a multi-view 3D image display device including an image display panel configured to display a 3D image, a control portion configured to control a viewpoint image of each of 3D pixel lines that provide multiple, at least four, viewpoints, and a viewer eye pupil position tracking system, the method comprising:

acquiring three dimensional coordinate values of positions of a viewer's eye pupils through the viewer eye pupil position tracking system;

selecting a first viewpoint and a second viewpoint that are close to centers of the viewer's eye pupils for a viewing zone of a viewpoint for each 3D pixel line by using the three dimensional coordinate values of positions of the viewer's eye pupils acquired from the viewer eye pupil position tracking system through the control portion;

providing a viewpoint image of one of the viewer's eyes to the first viewpoint and providing a viewpoint image of another of the viewer's eyes to the second viewpoint through the control portion;

providing the viewpoint image of the first viewpoint to a first number of one or more viewpoints adjacent to the first viewpoint to form a first integrated viewpoint and providing the viewpoint image of the second viewpoint to a second number one or more viewpoints adjacent to the second viewpoint to form a second integrated viewpoint; and in response to moving of the viewer in a depth direction, controlling at least one of the first integrated viewpoint and the second integrated viewpoint by increasing or reducing at least one of the first number and the second number based on an amount of movement of the viewer in the depth direction.

18. The method of claim 17, wherein the image display panel displays a 3D image by using a parallax barrier or lenticular lens which is a parallax separation means, or a line light source, and the 3D pixel line includes an aperture of the parallax barrier, the lenticular lens, or the line light source, and pixels on the image display panel for providing viewpoint images.

19. The method of claim 17, wherein brightness of each of the viewpoints constituting the first or second integrated viewpoint is adjusted through the control portion to flatten brightness of a central portion of each of integrated viewing zones formed by the first integrated viewpoint and the second integrated viewpoint.

* * * * *